US012786439B2

(12) United States Patent
Kim et al.

(10) Patent No.: US 12,786,439 B2
(45) Date of Patent: Nov. 3, 2026

(54) VIDEO SIGNAL PROCESSING METHOD AND APPARATUS THEREFOR

(71) Applicant: WILUS INSTITUTE OF STANDARDS AND TECHNOLOGY INC., Gyeonggi-do (KR)

(72) Inventors: Kyungyong Kim, Gyeonggi-do (KR); Dongcheol Kim, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 123 days.

(21) Appl. No.: 18/714,406

(22) PCT Filed: Nov. 29, 2022

(86) PCT No.: PCT/KR2022/019116
§ 371 (c)(1),
(2) Date: Dec. 17, 2024

(87) PCT Pub. No.: WO2023/096472
PCT Pub. Date: Jun. 1, 2023

(65) Prior Publication Data

US 2025/0150605 A1 May 8, 2025

(30) Foreign Application Priority Data

Nov. 29, 2021 (KR) ........................ 10-2021-0167427
Oct. 12, 2022 (KR) ........................ 10-2022-0130960

(51) Int. Cl.
*H04N 19/186* (2014.01)
*H04N 19/139* (2014.01)
(Continued)

(52) U.S. Cl.
CPC ......... *H04N 19/186* (2014.11); *H04N 19/139* (2014.11); *H04N 19/159* (2014.11); *H04N 19/176* (2014.11)

(58) Field of Classification Search
None
See application file for complete search history.

(56) References Cited

U.S. PATENT DOCUMENTS 11,197,005 B2 12/2021 Ramasubramonian et al.
2018/0098079 A1* 4/2018 Chuang ................. H04N 19/61
(Continued)

FOREIGN PATENT DOCUMENTS

KR 10-1516006 B1 5/2015
KR 10-2019-0055819 A 5/2019
(Continued)

OTHER PUBLICATIONS

International Search Report for PCT/KR2022/019116 mailed on Mar. 15, 2023 and its English translation from WIPO (now published as WO 2023/096472).
(Continued)

*Primary Examiner* — James M Anderson, II
(74) *Attorney, Agent, or Firm* — WOMBLE BOND DICKINSON (US) LLP

(57) ABSTRACT

A video signal processing method comprises the steps of: configuring a template including neighboring blocks of a current block; down-sampling luminance component samples of the neighboring blocks on the basis of a color format of a current picture including the current block; deriving a first linear model and a second linear model on the basis of the down-sampled luminance component samples; and on the basis of any one linear model from among the first linear model and the second linear model, predicting a chrominance component sample at a location corresponding
(Continued)

100 to a location of a first sample from among the luminance component samples of the current block, wherein the any one linear model is determined by comparing a value of the first sample with a threshold value.

10 Claims, 11 Drawing Sheets

(51) Int. Cl.
*H04N 19/159* (2014.01)
*H04N 19/176* (2014.01)

(56) References Cited

U.S. PATENT DOCUMENTS

2021/0112262 A1 4/2021 Jang
2021/0289201 A1* 9/2021 Bang .................... H04N 19/117
2021/0297656 A1 9/2021 Ma et al.
2022/0094940 A1* 3/2022 Bandyopadhyay .. H04N 19/132
2022/0124343 A1* 4/2022 Filippov .............. H04N 19/176

FOREIGN PATENT DOCUMENTS

KR 10-2021-0083353 A 7/2021
KR 10-2021-0113188 A 9/2021
WO WO-2019198997 A1 * 10/2019 ........... H04N 19/593
WO 2023/138627 A1 7/2023

OTHER PUBLICATIONS

Written Opinion of the International Searching Authority for PCT/KR2022/019116 mailed on Mar. 15, 2023 and its English translation from WIPO (now published as WO 2023/096472).
Office Action (1st) dated May 12, 2026 for Indian Patent Application No. 202417049473.

* cited by examiner

[Fig. 1]
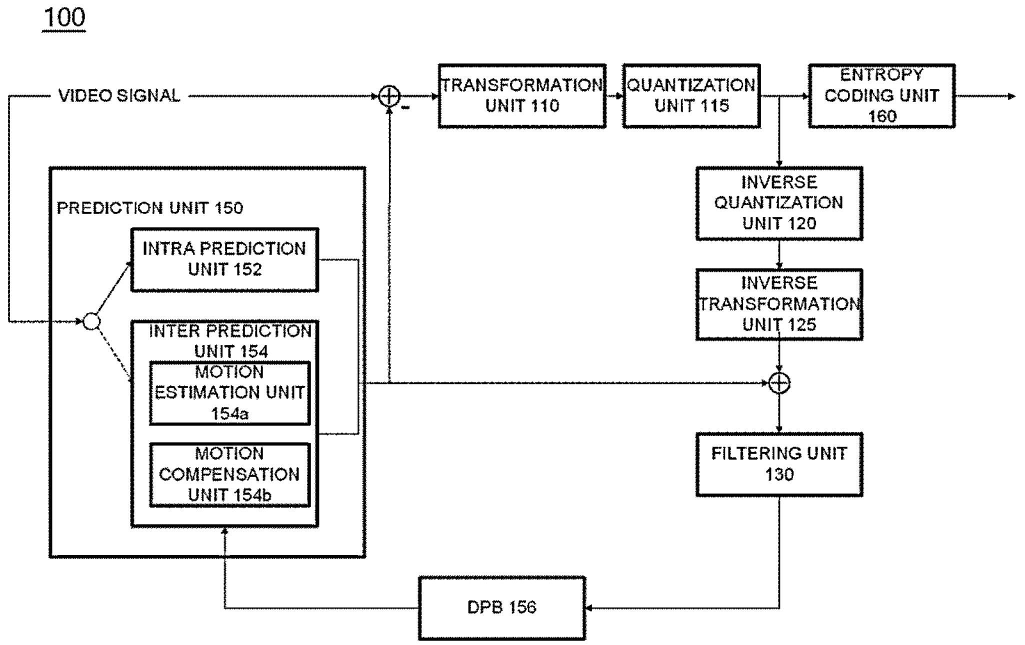
[Fig. 2]
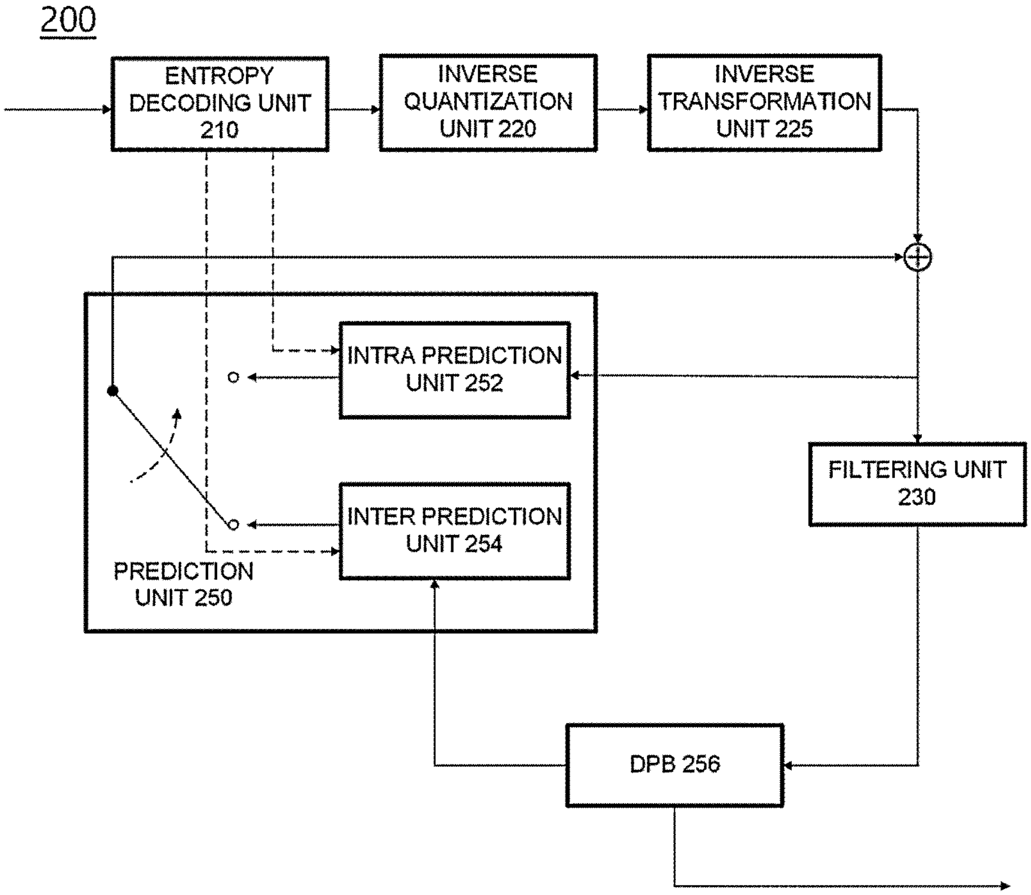

[Fig. 3]
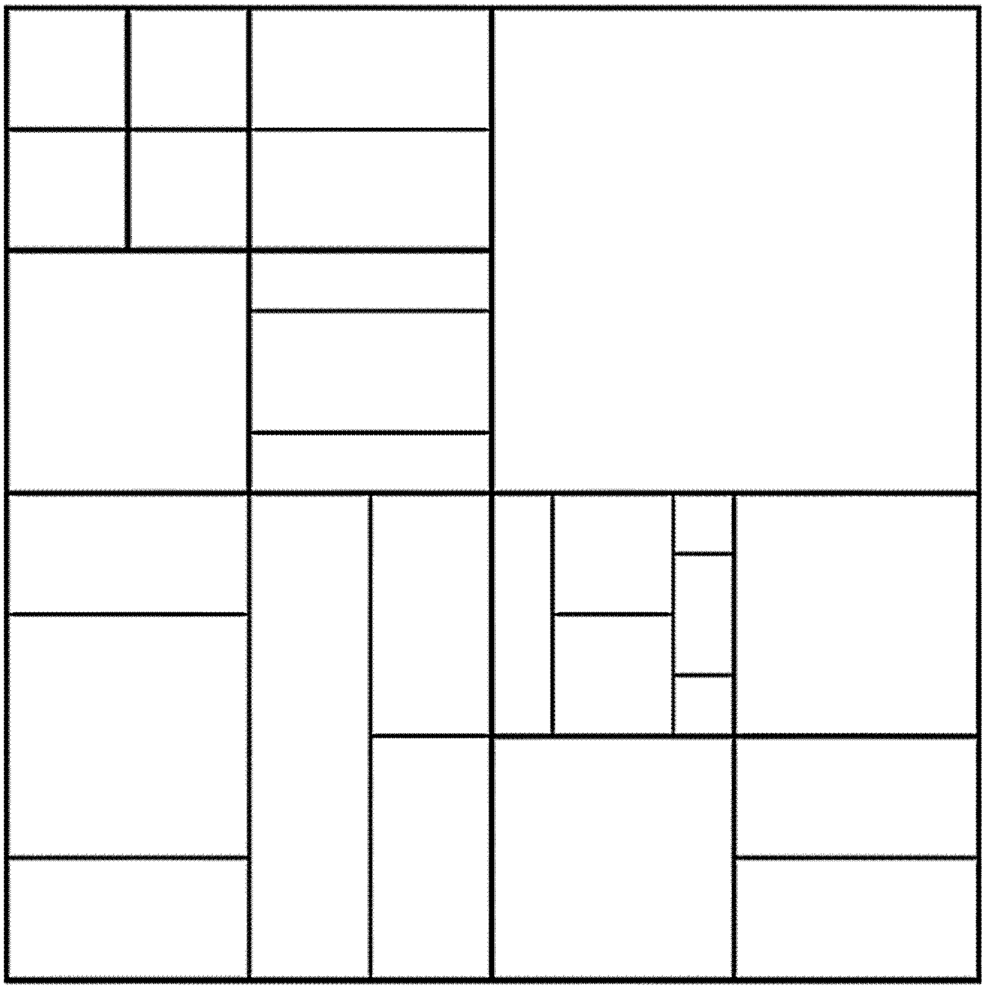
[Fig. 4]
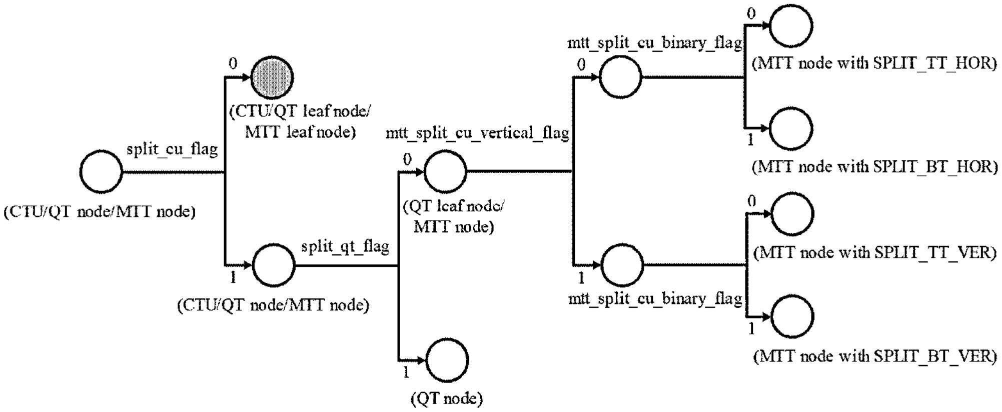

[Fig. 5]
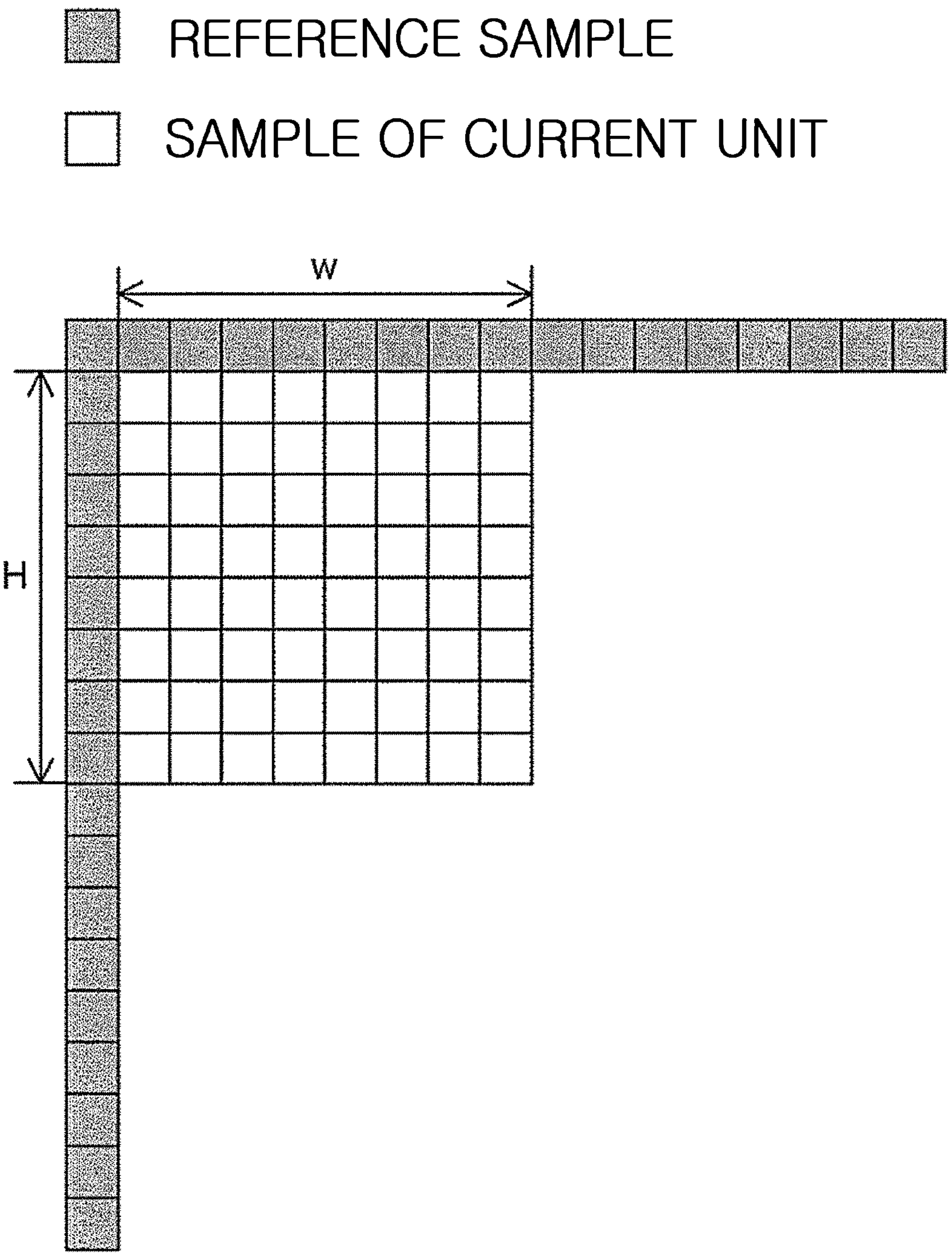

[Fig. 6]
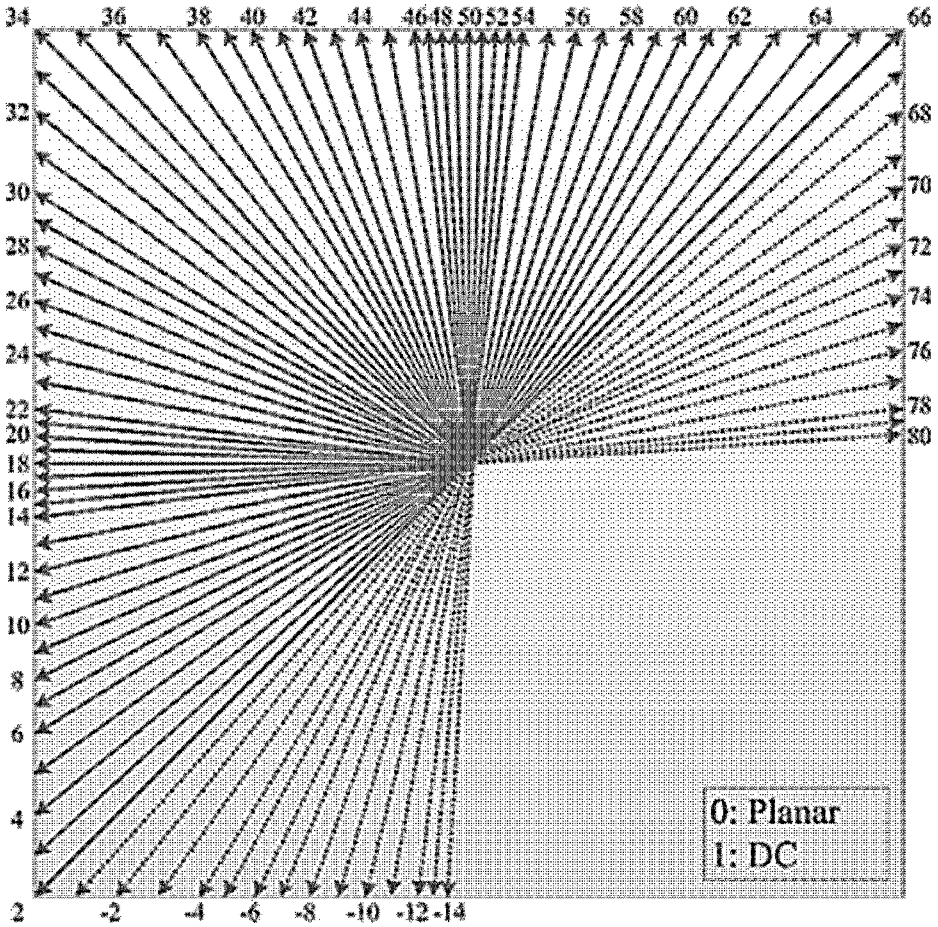

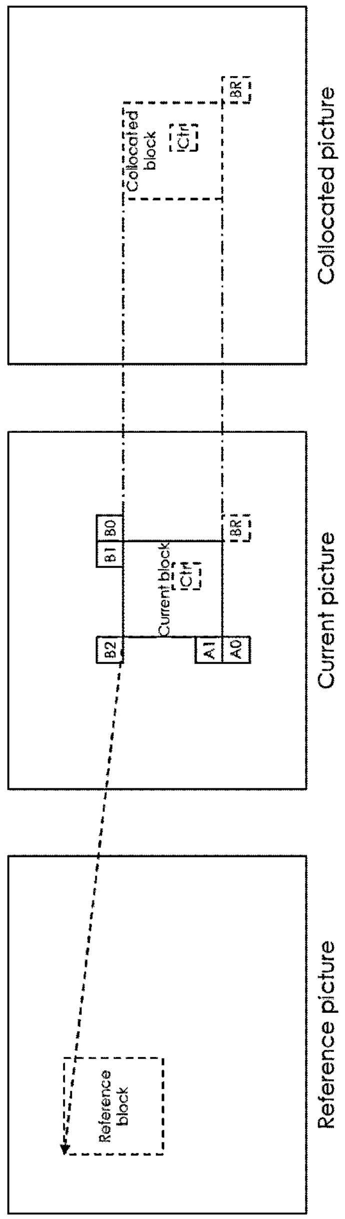
[Fig. 7]

[Fig. 8]
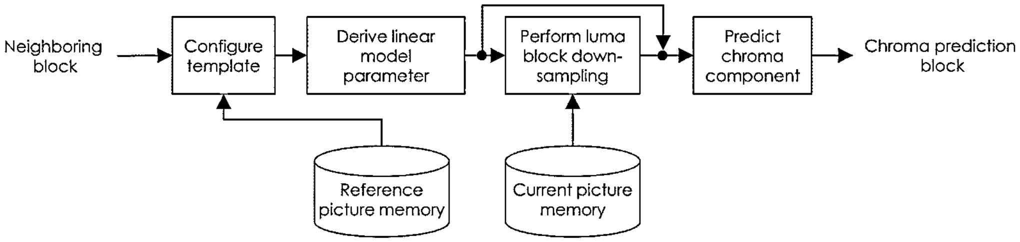
[Fig. 9]
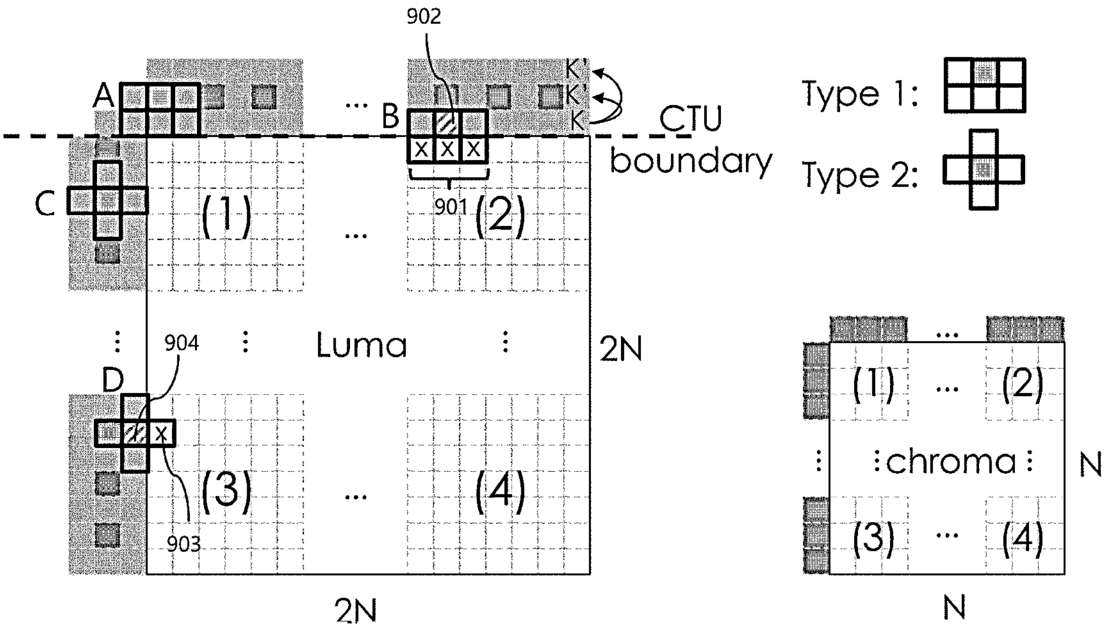

[Fig. 10]
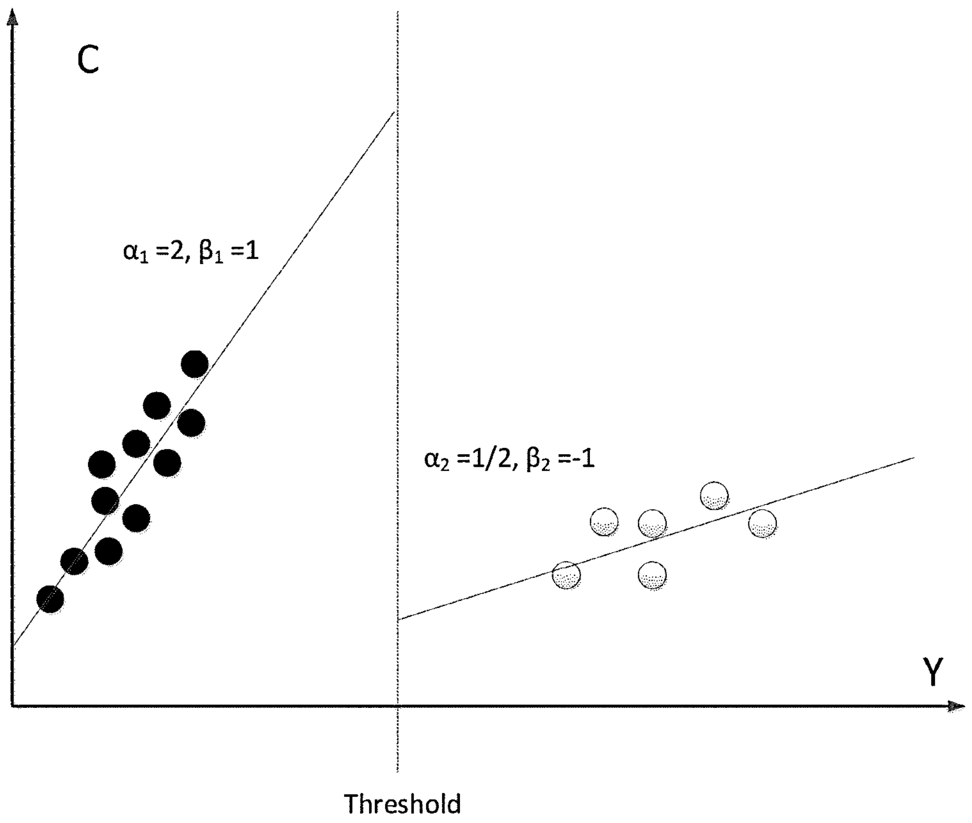

[Fig. 11]
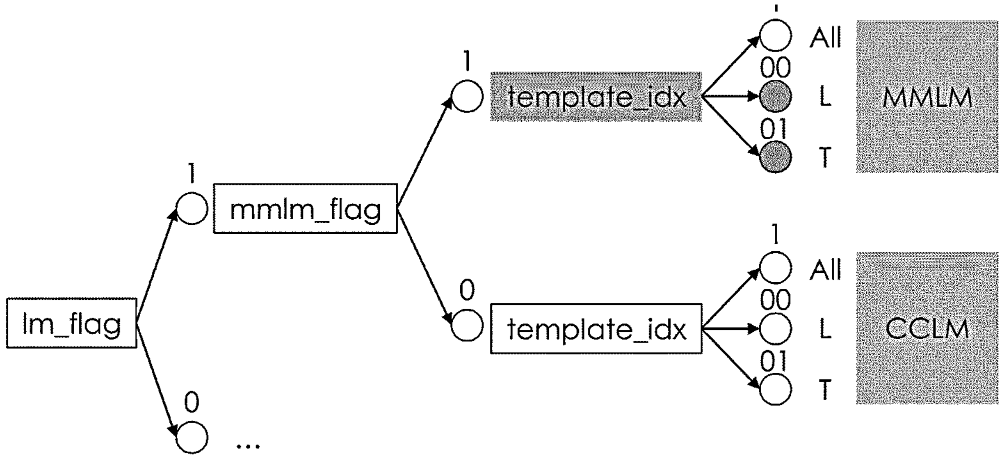
(a)
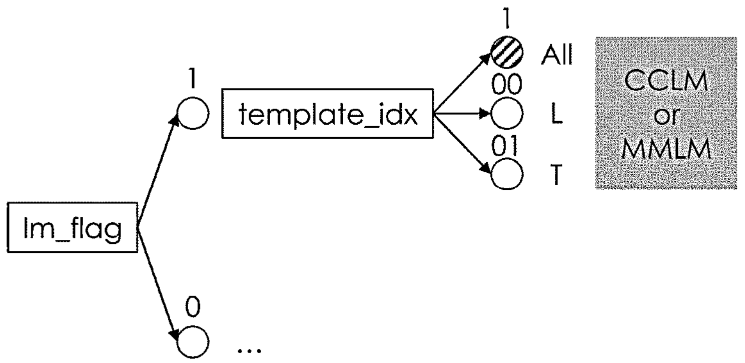
(b)
[Fig. 12]
| **Initialization variable** | **ctxIdx of mmlm_flag** | | | | | | | | |
|---|---|---|---|---|---|---|---|---|---|
| | 0 | 1 | 2 | 3 | 4 | 5 | 6 | 7 | 8 |
| initValue | 20 | 43 | 12 | 35 | 51 | 27 | 38 | 26 | 60 |
| shiftIdx | 4 | 5 | 0 | 4 | 5 | 0 | 4 | 5 | 0 |
(a)
| **Syntax element** | **initType** | | |
|---|---|---|---|
| | 0 (I Slice) | 1 (P Slice) | 2 (B Slice) |
| mmlm_flag | 0..2 | 3..5 | 6..8 |
(b)

[Fig. 13]
| Initialization variable | ctxIdx of template_idx | | | | | | | | |
|---|---|---|---|---|---|---|---|---|---|
| | 0 | 1 | 2 | 3 | 4 | 5 | 6 | 7 | 8 |
| initValue | 17 | 42 | 36 | 0 | 57 | 44 | 0 | 43 | 45 |
| shiftIdx | 1 | 5 | 8 | 1 | 5 | 8 | 1 | 5 | 8 |
(a)
| Syntax element | initType | | |
|---|---|---|---|
| | 0 (I Slice) | 1 (P Slice) | 2 (B Slice) |
| template_idx | 0..2 | 3..5 | 6..8 |
(b)
[Fig. 14]
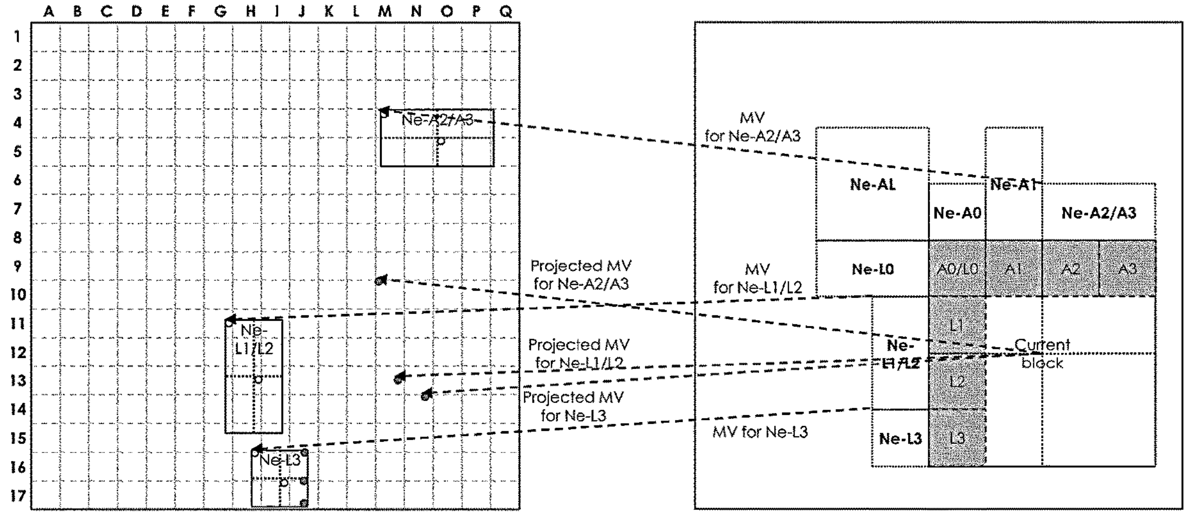
Reference picture Current picture

[Fig. 15]
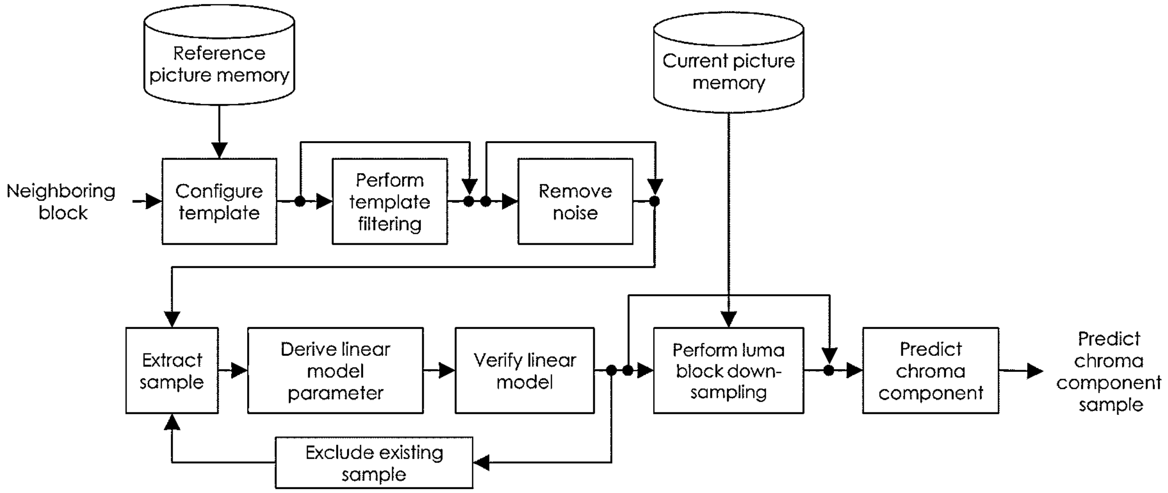
[Fig. 16]
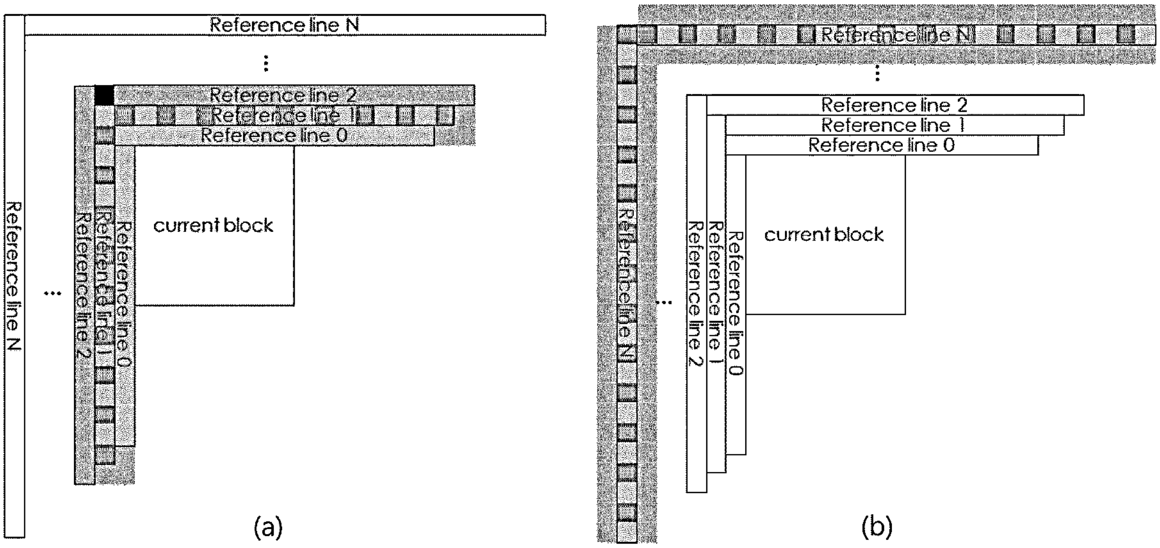

[Fig. 17]
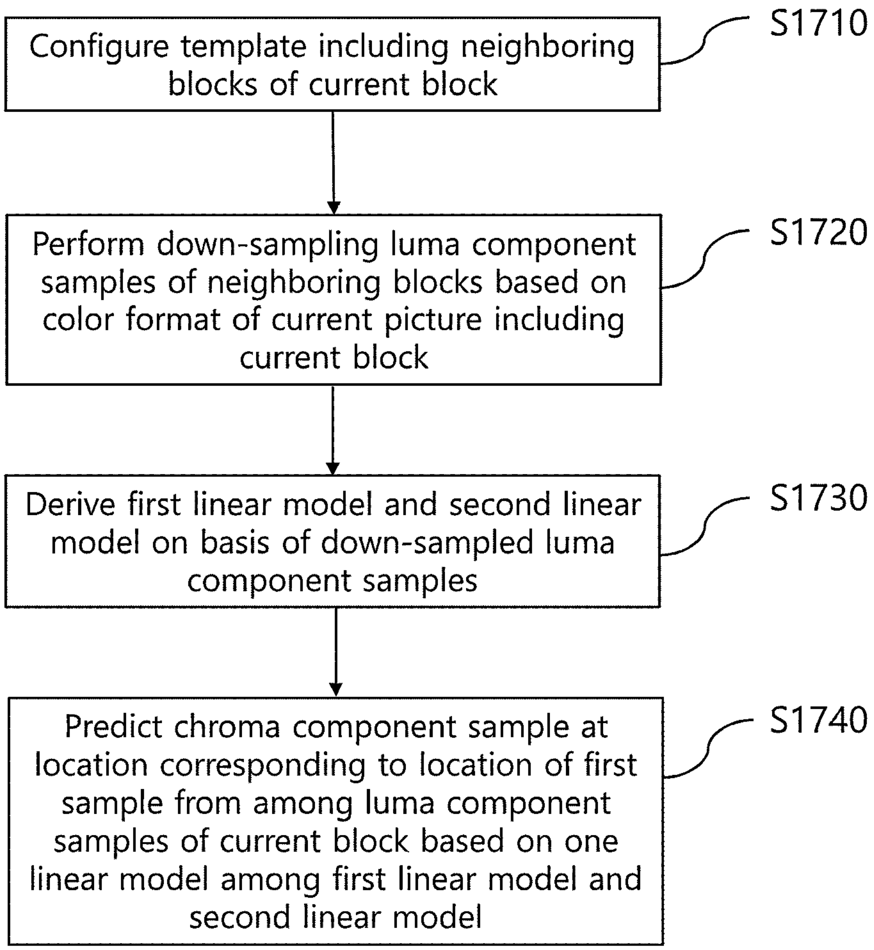

VIDEO SIGNAL PROCESSING METHOD AND APPARATUS THEREFOR

CROSS-REFERENCE TO RELATED APPLICATIONS

This application is the National Stage filing under 35 U.S.C. 371 of International Application No. PCT/KR2022/019116, filed on Nov. 29, 2022, which claims the benefit of KR Provisional Application No. 10-2021-0167427, filed on Nov. 29, 2021, and KR Provisional Application No. 10-2022-0130960, filed on Oct. 12, 2022, the contents of which are all hereby incorporated by reference herein in their entirety.

TECHNICAL FIELD

The present disclosure relates to a video signal processing method and device and, more specifically, to a video signal processing method and device by which a video signal is encoded or decoded.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

The purpose of the present disclosure is to provide a video signal processing method and a device therefor, so as to increase the coding efficiency of a video signal.

Solution to Problem

The present disclosure provides a video signal processing method and an apparatus therefor.

In the present disclosure, a video signal decoding apparatus includes a processor, wherein the processor is configured to: configure a template including neighboring blocks of a current block; perform down-sampling of luma component samples of the neighboring blocks on the basis of a color format of a current picture including the current block, derive a first linear model and a second linear model on the basis of the down-sampled luma component samples; and on the basis of one linear model from among the first linear model and the second linear model, predict a chroma component sample at a location corresponding to a location of a first sample from among the luma component samples of the current block, and the one linear model is determined by comparing a value of the first sample with a threshold value.

In addition, the processor performs high-frequency filtering or low-frequency filtering for the neighboring blocks included in the template.

In the present disclosure, a video signal encoding apparatus includes a processor, wherein the processor is configured to acquire a bitstream decoded by a decoding method.

In the present disclosure, a non-transitory computer-readable storage medium stores a bitstream. The bitstream is decoded by a decoding method.

In the present disclosure, the decoding method includes: configuring a template including neighboring blocks of a current block; performing down-sampling of luma component samples of the neighboring blocks on the basis of a color format of a current picture including the current block; deriving a first linear model and a second linear model on the basis of the down-sampled luma component samples; and on the basis of one linear model from among the first linear model and the second linear model, predicting a chroma component sample at a location corresponding to a location of a first sample from among the luma component samples of the current block, and the one linear model is determined by comparing a value of the first sample with a threshold value.

In addition, in the present disclosure, the decoding method includes performing high-frequency filtering or low-frequency filtering for the neighboring blocks included in the template.

In the present disclosure, the threshold value is an average value of reconstructed luma component blocks within the current block.

In the present disclosure, the threshold value is an average value of chroma component samples of the neighboring blocks.

In the present disclosure, the threshold value is determined on the basis of threshold information included in a bitstream.

In the present disclosure, the neighboring blocks included in the template are upper adjacent first blocks of the current block, left adjacent second blocks of the current block, or the first blocks and the second blocks.

In the present disclosure, the neighboring blocks included in the template are determined on the basis of an intra prediction directivity mode of the current block.

In the present disclosure, the neighboring blocks included in the template are determined by comparing a first quantization parameter value used for reconstruction of the first blocks and a second quantization parameter value used for reconstruction of the second blocks.

In the present disclosure, the neighboring blocks included in the template are determined on the basis of a size of the current block.

In the present disclosure, the neighboring blocks included in the template are determined on the basis of whether a cross-component linear model (CCLM) or a multi-model linear mode (MMLM) is applied to the first blocks and the second blocks.

In the present disclosure, the neighboring blocks included in the template are determined on the basis of neighboring block information included in a bitstream.

In the present disclosure, the neighboring blocks included in the template are blocks on a line spaced apart from the current block by a specific number of samples, or blocks on a line spaced apart from the current block by an interval equal to or less than the specific number of samples.

Advantageous Effects of Invention

The present disclosure provides a method for efficiently processing a video signal.

The effects which can be acquired from the present disclosure are not limited to the above-described effects, and other unmentioned effects can be clearly understood by those skilled in the art in the art to which the present disclosure belongs from the description below.

BRIEF DESCRIPTION OF DRAWINGS

FIG. 1 is a schematic block diagram of a video signal encoding apparatus according to an embodiment of the present invention.

FIG. 2 is a schematic block diagram of a video signal decoding apparatus according to an embodiment of the present invention.

FIG. 3 shows an embodiment in which a coding tree unit is divided into coding units in a picture.

FIG. 4 shows an embodiment of a method for signaling a division of a quad tree and a multi-type tree.

FIGS. 5 and 6 illustrate an intra-prediction method in more detail according to an embodiment of the present disclosure.

FIG. 7 illustrates the position of neighboring blocks used to construct a motion candidate list in inter prediction.

FIG. 8 illustrates a method for performing a CCLM according to an embodiment of the present disclosure.

FIG. 9 illustrates a template used to derive a linear model according to an embodiment of the present disclosure.

FIG. 10 illustrates a method for deriving two linear models according to an embodiment of the present disclosure.

FIG. 11 illustrates a method of signaling an intra prediction directivity mode for a chroma component block according to an embodiment of the present disclosure.

FIGS. 12 and 13 illustrate a context model according to an embodiment of the present disclosure.

FIG. 14 illustrates a method for deriving an intra prediction mode of a current block by using neighboring blocks according to an embodiment of the present disclosure.

FIG. 15 illustrates a method for acquiring a chroma prediction block according to an embodiment of the present disclosure.

FIG. 16 illustrates a reference area used to generate a linear model according to an embodiment of the present disclosure.

FIG. 17 illustrates a method for processing a video signal according to an embodiment of the present disclosure.

BEST MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, 'A and/or B' may be interpreted as meaning 'including at least one of A or B.'

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. Furthermore, a "block" refers to a region of an image that includes a particular component of a luma component and chroma components (i.e., Cb and Cr). However, depending on the embodiment, the terms "unit", "block", "partition", "signal", and "region" may be used interchangeably. Also, in the present specification, the term "current block" refers to a block that is currently scheduled to be encoded, and the term "reference block" refers to a block that has already been encoded or decoded and is used as a reference in a current block. In addition, the terms "luma", "luminance", "Y", and the like may be used interchangeably in this specification. Additionally, in the present specification, the terms "chroma", "chrominance", "Cb or Cr", and the like may be used interchangeably, and chroma components are classified into two components, Cb and Cr, and thus each chroma component may be distinguished and used. Additionally, in the present specification, the term "unit" may be used as a concept that includes a coding unit, a prediction unit, and a transform unit. A "picture" refers to a field or a frame, and depending on embodiments, the terms may be used interchangeably. Specifically, when a captured video is an interlaced video, a single frame may be separated into an odd (or cardinal or top) field and an even (or even-numbered or bottom) field, and each field may be configured in one picture unit and encoded or decoded. If the captured video is a progressive video, a single frame may be configured as a picture and encoded or decoded. In addition, in the present specification, the terms "error signal", "residual signal", "residue signal", "remaining signal", and "difference signal" may be used interchangeably. Also, in the present specification, the terms "intra-prediction mode", "intra-prediction directional mode", "intra-picture prediction mode", and "intra-picture prediction directional mode" may be used interchangeably. In addition, in the present specification, the terms "motion", "movement", and the like may be used interchangeably. Also, in the present specification, the terms "left", "left above", "above", "right above", "right", "right below", "below", and "left below" may be used interchangeably with "leftmost", "top left", "top", "top right", "right", "bottom right", "bottom", and "bottom left". Also, the terms "element" and "member" may be used interchangeably. Picture order count (POC) represents temporal position information of pictures (or frames), and may be the playback order in which displaying is performed on a screen, and each picture may have unique POC.

FIG. 1 is a schematic block diagram of a video signal encoding apparatus according to an embodiment of the present invention. Referring to FIG. 1, the encoding apparatus 100 of a the present invention includes transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. A transform kernel used for the transform of a residual block may has characteristics that allow a vertical transform and a horizontal transform to be separable. In this case, the transform of the residual block may be performed separately as a vertical transform and a horizontal transform. For example, an encoder may transform by applying a transform perform a vertical kernel in the vertical direction of a residual block. In addition, the encoder may perform a horizontal transform by applying the transform kernel in the horizontal direction of the residual block. In the present disclosure, the transform kernel may be used to refer to a set of parameters used for the transform of a residual signal, such as a transform matrix, a transform array, a transform function, or transform. For example, a transform kernel may be any one of multiple available kernels. Also, transform kernels based on different transform types may be used for the vertical transform and the horizontal transform, respectively.

The transform coefficients are distributed with higher coefficients toward the top left of a block and coefficients closer to "0" toward the bottom right of the block. As the size of a current block increases, there are likely to be many coefficients of "0" in the bottom-right region of the block. To reduce the transform complexity of a large-sized block, only a random top-left region may be kept and the remaining region may be reset to "0".

In addition, error signals may be present in only some regions of a coding block. In this case, the transform process may be performed on only some random regions. In an embodiment, in a block having a size of 2N×2N, an error signal may be present only in the first 2N×N block, and the transform process may be performed on the first 2N×N block. However, the second 2N×N block may not be transformed and may not be encoded or decoded. Here, N may be any positive integer.

The encoder may perform an additional transform before transform coefficients are quantized. The above-described transform method may be referred to as a primary transform, and the additional transform may be referred to as a secondary transform. The secondary transform may be selective for each residual block. According to an embodiment, the encoder may improve coding efficiency by performing a secondary transform for regions where it is difficult to focus energy in a low-frequency region by using a primary transform alone. For example, a secondary transform may be additionally performed for blocks where residual values appear large in directions other than the horizontal or vertical direction of a residual block. Unlike a primary transform, a secondary transform may not be performed separately as a vertical transform and a horizontal transform. Such a secondary transform may be referred to as a low frequency non-separable transform (LFNST).

The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The deblocking filter is a filter for removing intra-block distortions generated at the boundaries between blocks in a reconstructed picture. Through the distribution of pixels included in several columns or rows based on random edges in a block, the encoder may determine whether to apply a deblocking filter to the edges. When applying a deblocking filter to the block, the encoder may apply a long filter, a strong filter, or a weak filter depending on the strength of deblocking filtering. Additionally, horizontal filtering and vertical filtering may be processed in parallel. The sample adaptive offset (SAO) may be used to correct offsets from an original video on a pixel-by-pixel basis with respect to a residual block to which a deblocking filter has been applied. To correct offset for a particular picture, the encoder may use a technique that divides pixels included in the picture into a predetermined number of regions, determines a region in which the offset correction is to be performed, and applies the offset to the region (Band Offset). Alternatively, the encoder may use a method for applying an offset in consideration of edge information of each pixel (Edge Offset). The adaptive loop filter (ALF) is a technique of dividing pixels included in a video into predetermined groups and then determining one filter to be applied to each group, thereby performing filtering differently for each group. Information about whether to apply ALF may be signaled on a per-coding unit basis, and the shape and filter coefficients of an ALF to be applied may vary for each block. In addition, an ALF filter having the same shape (a fixed shape) may be applied regardless of the characteristics of a target block to which the ALF filter is to be applied.

The prediction unit 150 includes an intra-prediction unit 152 and an inter-prediction unit 154. The intra-prediction unit 152 performs intra prediction within a current picture, and the inter-prediction unit 154 performs inter prediction to predict the current picture by using a reference picture stored in the decoded picture buffer 156. The intra-prediction unit 152 performs intra prediction from reconstructed regions in the current picture and transmits intra encoding information to the entropy coding unit 160. The intra encoding information may include at least one of an intra-prediction mode, a most probable (MPM) mode an MPM flag, index, and information regarding a reference sample. The inter-prediction unit 154 may again include a motion estimation unit **154*a* and a motion compensation unit 154*b*. The motion estimation unit 154*a* finds a part most similar to a current region with reference to a specific region of a reconstructed reference picture, and obtains a motion vector value which is the distance between the regions. Reference region-related motion information (reference direction indication information (L0 prediction, L1 prediction, or bidirectional prediction), a reference picture index, motion vector information, etc.) and the like, obtained by the motion estimation unit 154***a*, are transmitted to the entropy coding unit 160 so as to be included in a bitstream. The motion compensation unit 154B performs inter-motion compensation by using the motion information transmitted by the motion estimation unit 154*a*, to generate a prediction block for the current block. The inter-prediction unit 154 transmits the inter encoding information, which includes motion information related to the reference region, to the entropy coding unit 160.

According to an additional embodiment, the prediction unit 150 may include an intra block copy (IBC) prediction unit (not shown). The IBC prediction unit performs IBC prediction from reconstructed samples in a current picture and transmits IBC encoding information to the entropy coding unit 160. The IBC prediction unit references a specific region within a current picture to obtain a block vector value that indicates a reference region used to predict a current region. The IBC prediction unit may perform IBC prediction by using the obtained block vector value. The IBC prediction unit transmits the IBC encoding information to the entropy coding unit 160. The IBC encoding information may include at least one of reference region size information and block vector information (index information for predicting the block vector of a current block in a motion candidate list, and block vector difference information).

When the above picture prediction is performed, the transform unit 110 transforms a residual value between an original picture and a predictive picture to obtain a transform coefficient value. At this time, the transform may be performed on a specific block basis in the picture, and the size of the specific block may vary within a predetermined range. The quantization unit 115 quantizes the transform coefficient value generated by the transform unit 110 and transmits the quantized transform coefficient to the entropy coding unit 160.

The quantized transform coefficients in the form of a two-dimensional array may be rearranged into a one-dimensional array for entropy coding. In relation to methods for scanning a quantized transform coefficient, the size of a transform block and an intra-picture prediction mode may determine which scanning method is used. In an embodiment, diagonal, vertical, and horizontal scans may be applied. This scan information may be signaled on a block-by-block basis, and may be derived based on predetermined rules.

The entropy coding unit 160 generates a video signal bitstream by entropy coding information indicating a quantized transform coefficient, intra encoding information, and inter encoding information. The entropy coding unit 160 may use variable length coding (VLC) and arithmetic coding. The variable length coding (VLC) is a technique of transforming input symbols into consecutive codewords, wherein the length of the codewords is variable. For example, frequently occurring symbols are represented by shorter codewords, while less frequently occurring symbols are represented by longer codewords. As the variable length coding, context-based adaptive variable length coding (CAVLC) may be used. The arithmetic coding uses the probability distribution of each data symbol to transform consecutive data symbols into a single decimal number. The arithmetic coding allows acquisition of the optimal decimal bits needed to represent each symbol. As the arithmetic coding, context-based adaptive binary arithmetic coding (CABAC) may be used.

CABAC is a binary arithmetic coding technique using multiple context models generated based on probabilities obtained from experiments. First, when symbols are not in binary form, the encoder binarizes each symbol by using exp-Golomb, etc. The binarized value, 0 or 1, may be described as a bin. A CABAC initialization process is divided into context initialization and arithmetic coding initialization. The context initialization is the process of initializing the probability of occurrence of each symbol, and is determined by the type of symbol, a quantization parameter (QP), and slice type (I, P, or B). A context model having the initialization information may use a probability-based value obtained through an experiment. The context model provides information about the probability of occurrence of Least Probable Symbol (LPS) or Most Probable Symbol (MPS) for a symbol to be currently coded and about which of bin values 0 and 1 corresponds to the MPS (valMPS). One of multiple context models is selected via a context index (ctxIdx), and the context index may be derived from information in a current block to be encoded or from information about neighboring blocks. Initialization for binary arithmetic coding is performed based on a probability model selected from the context models. In the binary arithmetic coding, encoding is performed through the process in which division into probability intervals is made through the probability of occurrence of 0 and 1, and then a probability interval corresponding to a bin to be processed becomes the entire probability interval for the next bin to be processed. Information about a position within the last bin in which the last bin has been processed is output. However, the probability interval cannot be divided indefinitely, and thus, when the probability interval is reduced to a certain size, a renormalization process is performed to widen the probability interval and the corresponding position information is output. In addition, after each bin is processed, a probability update process may be performed, wherein information about a processed bin is used to set a new probability for the next to be processed.

The generated bitstream is encapsulated in network abstraction layer (NAL) unit as basic units. The NAL units are classified into video a coding layer (VCL) NAL unit, which includes video data, and a non-VCL NAL unit, which includes parameter information for decoding video data. There are various types of VCL or non-VCL NAL units. A NAL unit includes NAL header information and raw byte sequence payload (RBSP) which is data. The NAL header information includes summary information about the RBSP. The RBSP of a VCL NAL unit includes an integer number of encoded coding tree units. In order to decode a bitstream in a video decoder, it is necessary to separate the bitstream into NAL units and then decode each of the separate NAL units. Information required for decoding a video signal bitstream may be included in a picture parameter set (PPS), a sequence parameter set (SPS), a video parameter set (VPS), etc., and transmitted.

The block diagram of FIG. 1 illustrates the encoding device 100 according to an embodiment of the present disclosure, wherein the separately shown blocks logically distinguish the elements of the encoding device 100. Accordingly, the above-described elements of the encoding device 100 may be mounted as a single chip or multiple chips, depending on the design of the device. According to an embodiment, the above-described operation of each element of the encoding device 100 may be performed by a processor (not shown).

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each inter block among pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures are pictures located temporally before or after the current picture, and may be pictures for which reconstruction has already been completed. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an IBC prediction unit (not shown). The IBC prediction unit may reconstruct the current region by referring to a specific region including reconstructed samples in the current picture. The IBC prediction unit obtains IBC encoding information for the current region from the entropy decoding unit 210. The IBC prediction unit obtains a block vector value of the current region indicating the specific region in the current picture. The IBC prediction unit may perform IBC prediction by using the obtained block vector value. The IBC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

The technology proposed in the present specification may be applied to a method and a device for both an encoder and a decoder, and the wording signaling and parsing may be for convenience of description. In general, signaling may be described as encoding each type of syntax from the perspective of the encoder, and parsing may be described as interpreting each type of syntax from the perspective of the decoder. In other words, each type of syntax may be included in a bitstream and signaled by the encoder, and the decoder may parse the syntax and use the syntax in a reconstruction process. In this case, the sequence of bits for each type of syntax arranged according to a prescribed hierarchical configuration may be called a bitstream.

One picture may be partitioned into sub-pictures, slices, tiles, etc. and encoded. A sub-picture may include one or more slices or tiles. When one picture is partitioned into multiple slices or tiles and encoded, all the slices or tiles within the picture must be decoded before the picture can be output a screen. On the other hand, when one picture is encoded into multiple subpictures, only a random subpicture may be decoded and output on the screen. A slice may include multiple tiles or subpictures. Alternatively, a tile may include multiple subpictures or slices. Subpictures, slices, and tiles may be encoded or decoded independently of each other, and thus are advantageous for parallel processing and processing speed improvement. However, there is the disadvantage in that a bit rate increases because encoded information of other adjacent subpictures, slices, and tiles is not available. A subpicture, a slice, and a tile may be partitioned into multiple coding tree units (CTUs) and encoded.

FIG. 3 illustrates an embodiment in which a coding tree unit (CTU) is divided into coding units (CUs) within a picture. In the process of coding a video signal, a picture may be divided into a sequence of coding tree units (CTUs). A coding tree unit may include a luma Coding Tree Block (CTB), two chroma coding tree blocks, and encoded syntax information thereof. One coding tree unit may include one coding unit, or one coding tree unit may be divided into multiple coding units. One coding unit may include a luma coding block (CB), two chroma coding blocks, and encoded syntax information thereof. One coding block may be partitioned into multiple sub-coding blocks. One coding unit may include one transform unit (TU), or one coding unit may be partitioned into multiple transform units. A transform unit may include a luma transform block (TB), two chroma transform blocks, and encoded syntax information thereof. A coding tree unit may be partitioned into multiple coding units. A coding tree unit may become a leaf node without being partitioned. In this case, the coding tree unit itself may be a coding unit.

The coding unit refers to a basic unit for processing a picture in the process of processing the video signal that described above, is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2NX2N size may be split into two NX2N nodes by vertical binary split, and split into two 2NXN nodes by horizontal binary split. In addition, in a ternary tree (TT) structure, a node of a 2NX2N size is split into (N/2) X2N, NX2N, and (N/2) X2N nodes by vertical ternary split, and split into 2NX (N/2), 2NXN, and 2NX (N/2) nodes by horizontal ternary split. This multi-type tree split can be performed recursively.

A leaf node of the multi-type tree can be a coding unit. When the coding unit is not greater than the maximum transform length, the coding unit can be used as a unit of prediction and/or transform without further splitting. As an embodiment, when the width or height of the current coding unit is greater than the maximum transform length, the current coding unit can be split into a plurality of transform units without explicit signaling regarding splitting. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

FIG. 4 illustrates an embodiment of a method of signaling splitting of the quad tree and multi-type tree. Preset flags can be used to signal the splitting of the quad tree and multi-type tree described above. Referring to FIG. 4, at least one of a flag 'split_cu_flag' indicating whether or not to split a node, a flag 'split_qt_flag' indicating whether or not to split a quad tree node, a flag 'mtt_split_cu_vertical_flag' indicating a splitting direction of the multi-type tree node, or a flag 'mtt_split_cu_binary_flag' indicating a splitting shape of the multi-type tree node can be used.

According to an embodiment of the present invention, 'split_cu_flag', which is a flag indicating whether or not to split the current node, can be signaled first. When the value of 'split_cu_flag' is 0, it indicates that the current node is not split, and the current node becomes a coding unit. When the current node is the coating tree unit, the coding tree unit includes one unsplit coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes the coding unit.

When the value of 'split_cu_flag' is 1, the current node can be split into nodes of the quad tree or multi-type tree according to the value of 'split_qt_flag'. A coding tree unit is a root node of the quad tree, and can be split into a quad tree structure first. In the quad tree structure, 'split_qt_flag' is signaled for each node 'QT node'. When the value of 'split_qt_flag' is 1, the corresponding node is split into 4 square nodes, and when the value of 'qt_split_flag' is 0, the corresponding node becomes the 'QT leaf node' of the quad tree, and the corresponding node is split into multi-type nodes. According to an embodiment of the present invention, quad tree splitting can be limited according to the type of the current node. Quad tree splitting can be allowed when the current node is the coding tree unit (root node of the quad tree) or the quad tree node, and quad tree splitting may not be allowed when the current node is the multi-type tree node. Each quad tree leaf node 'QT leaf node' can be further split into a multi-type tree structure. As described above, when 'split_qt_flag' is 0, the current node can be split into multi-type nodes. In order to indicate the splitting direction and the splitting shape, 'mtt_split_cu_vertical_flag' and 'mtt_split_cu_binary_flag' can be signaled. When the value of 'mtt_split_cu_vertical_flag' is 1, vertical splitting of the node 'MTT node' is indicated, and when the value of 'mtt_split_cu_vertical_flag' is 0, horizontal splitting of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

In the tree partitioning structure, a luma block and a chroma block may be partitioned in the same form. That is, a chroma block may be partitioned by referring to the partitioning form of a luma block. When a current chroma block is less than a predetermined size, a chroma block may not be partitioned even if a luma block is partitioned.

In the tree partitioning structure, a luma block and a chroma block may have different forms. In this case, luma block partitioning information and chroma block partitioning information may be signaled separately. Furthermore, in addition to the partitioning information, luma block encoding information and chroma block encoding information may also be different from each other. In one example, the luma block and the chroma block may be different in at least one among intra encoding mode, encoding information for motion information, etc.

A node to be split into the smallest units may be treated as one coding block. When a current block is a coding block, the coding block may be partitioned into several sub-blocks (sub-coding blocks), and the sub-blocks may have the same prediction information or different pieces of prediction information. In one example, when a coding unit is in an intra mode, intra-prediction modes of sub-blocks may be the same or different from each other. Also, when the coding unit is in an inter mode, sub-blocks may have the same motion information or different pieces of the motion information. Furthermore, the sub-blocks may be encoded or decoded independently of each other. Each sub-block may be distinguished by a sub-block index (sbIdx). Also, when a coding unit is partitioned into sub-blocks, the coding unit may be partitioned horizontally, vertically, or diagonally. In an intra mode, a mode in which a current coding unit is partitioned into two or four sub-blocks horizontally or vertically is called intra sub-partitions (ISP). In an inter mode, a mode in which a current coding block is partitioned diagonally is called a geometric partitioning mode (GPM). In the GPM mode, the position and direction of a diagonal line are derived using a predetermined angle table, and index information of the angle table is signaled.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is WXH and samples of a single reference line adjacent to the current block are used for intra prediction, reference samples may be configured using a maximum of 2 W+2H+1 neighboring samples located on the left and/or upper side of the current block.

Pixels from multiple reference lines may be used for intra prediction of the current block. The multiple reference lines may include n lines located within a predetermined range from the current block. According to an embodiment, when pixels from multiple reference lines are used for intra prediction, separate index information that indicates lines to be set as reference pixels may be signaled, and may be named a reference line index.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode plurality information indicates one of a of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range can be set differently depending on a shape of the current block. For example, if the current block is a rectangular block, a wide angle mode indicating an angle exceeding 45 degrees or less than −135 degrees in a clockwise direction can be additionally used. When the current block is a horizontal block, an angle mode can indicate an angle within an angle range (i.e., a second angle range) between (45+offset1) degrees and (−135+offset1) degrees in a clockwise direction. In this case, angle modes 67 to 76 outside the first angle range can be additionally used. In addition, if the current block is a vertical block, the angle mode can indicate an angle within an angle range (i.e., a third angle range) between (45−offset2) degrees and (−135−offset2) degrees in a clockwise direction. In this case, angle modes −10 to −1 outside the first angle range can be additionally used. According to an embodiment of the present disclosure, values of offset1 and offset2 can be determined differently depending on a ratio between the width and height of the rectangular block. In addition, offset1 and offset2 can be positive numbers.

According to a further embodiment of the present invention, a plurality of angle modes configuring the intra prediction mode set can include a basic angle mode and an extended angle mode. In this case, the extended angle mode can be determined based on the basic angle mode.

According to an embodiment, the basic angle mode is a mode corresponding to an angle used in intra prediction of the existing high efficiency video coding (HEVC) standard, and the extended angle mode can be a mode corresponding to an angle newly added in intra prediction of the next generation video codec standard. More specifically, the basic angle mode can be an angle mode corresponding to any one of the intra prediction modes {2, 4, 6, . . . , 66}, and the extended angle mode can be an angle mode corresponding to any one of the intra prediction modes {3, 5, 7, . . . , 65}. That is, the extended angle mode can be an angle mode between basic angle modes within the first angle range. Accordingly, the angle indicated by the extended angle mode can be determined on the basis of the angle indicated by the basic angle mode.

According to another embodiment, the basic angle mode can be a mode corresponding to an angle within a preset first angle range, and the extended angle mode can be a wide angle mode outside the first angle range. That is, the basic angle mode can be an angle mode corresponding to any one of the intra prediction modes {2, 3, 4, . . . , 66}, and the extended angle mode can be an angle mode corresponding to any one of the intra prediction modes {−14, −13, −12, . . . , −1} and {67, 68, . . . , 80}. The angle indicated by the extended angle mode can be determined as an angle on a side opposite to the angle indicated by the corresponding basic angle mode. Accordingly, the angle indicated by the extended angle mode can be determined on the basis of the angle indicated by the basic angle mode. Meanwhile, the number of extended angle modes is not limited thereto, and additional extended angles can be defined according to the size and/or shape of the current block. Meanwhile, the total number of intra prediction modes included in the intra prediction mode set can vary depending on the configuration of the basic angle mode and extended angle mode described above In the embodiments described above, the spacing between the extended angle modes can be set on the basis of the spacing between the corresponding basic angle modes. For example, the spacing between the extended angle modes {3, 5, 7, . . . , 65} can be determined on the basis of the spacing between the corresponding basic angle modes {2, 4, 6, . . . , 66}. In addition, the spacing between the extended angle modes {−14, −13, . . . , −1} can be determined on the basis of the spacing between corresponding basic angle modes {53, 54, . . . , 66} on the opposite side, and the spacing between the extended angle modes {67, 68, . . . , 80} can be determined on the basis of the spacing between the corresponding basic angle modes {2, 3, 4, . . . , 15} on the opposite side. The angular spacing between the extended angle modes can be set to be the same as the angular spacing between the corresponding basic angle modes. In addition, the number of extended angle modes in the intra prediction mode set can be set to be less than or equal to the number of basic angle modes.

According to an embodiment of the present invention, the extended angle mode can be signaled based on the basic angle mode. For example, the wide angle mode (i.e., the extended angle mode) can replace at least one angle mode (i.e., the basic angle mode) within the first angle range. The basic angle mode to be replaced can be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced can be remapped to the wide angle mode to signal the corresponding wide angle mode. For example, the wide angle modes {−14, −13, . . . , −1} can be signaled by the intra prediction mode indices {52, 53, . . . , 66}, respectively, and the wide angle modes {67, 68, . . . , 80} can be signaled by the intra prediction mode indices {2, 3, . . . , 15}, respectively. In this way, the intra prediction mode index for the basic angle mode signals the extended angle mode, and thus the same set of intra prediction mode indices can be used for signaling the intra prediction mode even if the configuration of the angle modes used for intra prediction of each block are different from each other. Accordingly, signaling overhead due to a change in the intra prediction mode configuration can be minimized.

Meanwhile, whether or not to use the extended angle mode can be determined on the basis of at least one of the shape and size of the current block. According to an embodiment, when the size of the current block is greater than a preset size, the extended angle mode can be used for intra prediction of the current block, otherwise, only the basic angle mode can be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra-prediction unit determines reference samples and/or interpolated reference samples to be used for intra prediction of the current block, based on the intra-prediction mode information of the current block. When the intra-prediction mode index indicates a specific angular mode, a reference sample corresponding to the specific angle or an interpolated reference sample from current samples in the current block is used for prediction of a current pixel. Thus, different sets of reference samples and/or interpolated reference samples may be used for intra prediction depending on the intra-prediction mode. After the intra prediction of the current block is performed using the reference samples and the intra-prediction mode information, the decoder reconstructs sample values of the current block by adding the residual signal of the current block, which has been obtained from the inverse transform unit, to the intra-prediction value of the current block.

Motion information used for inter prediction may include reference direction indication information (inter_pred_idc), reference picture index (ref_idx_l0, ref_idx_l1), and motion vector (mvL0, mvL1). Reference picture list utilization information (predFlagL0, predFlagL1) may be set based on the reference direction indication information. In one example, for a unidirectional prediction using an L0 reference picture, predFlagL0=1 and predFlagL1=0 may be set. For a unidirectional prediction using an L1 reference picture, predFlagL0=0 and predFlagL1=1 may be set. For bidirectional prediction using both the L0 and L1 reference pictures, predFlagL0=1 and predFlagL1=1 may be set.

When the current block is a coding unit, the coding unit may be partitioned into multiple sub-blocks, and the sub-blocks have the same prediction information or different pieces of prediction information. In one example, when the coding unit is in an intra mode, intra-prediction modes of the sub-blocks may be the same or different from each other. Also, when the coding unit is in an inter mode, the sub-blocks may have the same motion information or different pieces of motion information. Furthermore, the sub-blocks may be encoded or decoded independently of each other. Each sub-block may be distinguished by a sub-block index (sbIdx).

The motion vector of the current block is likely to be similar to the motion vector of a neighboring block. Therefore, the motion vector of the neighboring block may be used as a motion vector predictor (MVP), and the motion vector of the current block may be derived using the motion vector of the neighboring block. Furthermore, to improve the accuracy of the motion vector, the motion vector difference (MVD) between the optimal motion vector of the current block and the motion vector predictor found by the encoder from an original video may be signaled.

The motion vector may have various resolutions, and the resolution of the motion vector may vary on a block-by-block basis. The motion vector resolution may be expressed in integer units, half-pixel units, ¼ pixel units, 1/16 pixel units, 4-integer pixel units, etc. A video, such as screen content, has a simple graphical form such as text, and does not require an interpolation filter to be applied. Thus, integer units and 4-integer pixel units may be selectively applied on a block-by-block basis. A block encoded using an affine mode, which represent rotation and scale, exhibit significant changes in form, so integer units, ¼ pixel units, and 1/16 pixel units may be applied selectively on a block-by-block basis. Information about whether to selectively apply motion vector resolution on a block-by-block basis is signaled by amvr_flag. If applied, information about a motion vector resolution to be applied to the current block is signaled by amvr_precision_idx.

In the case of blocks to which bidirectional prediction is applied, weights applied between two prediction blocks may be equal or different, and information about the weights is signaled via BCW_IDX.

In order to improve the accuracy of the motion vector predictor, a merge or AMVP (advanced motion vector prediction) method may be selectively used on a block-by-block basis. The merge method is a method that configures motion information of a current block to be the same as motion information of a neighboring block adjacent to the current block, and is advantageous in that the motion information is spatially propagated without change in a motion region with homogeneity, and thus the encoding efficiency of the motion information is increased. On the other hand, the AMVP method is a method for predicting motion information in L0 and L1 prediction directions respectively and signaling the most optimal motion information in order to represent accurate motion information. The decoder derives motion information for a current block by using the AMVP or merge method, and then uses a reference block, located in the motion information in a reference picture, as a prediction block for the current block.

A method of deriving motion information in Merge or AMVP involves a method for constructing a motion candidate list using motion vector predictors derived from neighboring blocks of the current block, and then signaling index information for the optimal motion candidate. In the case of AMVP, motion candidate lists are derived for L0 and L1, respectively, so the most optimal motion candidate indexes (mvp_l0_flag, mvp_l1_flag) for L0 and L1 are signaled, respectively. In the case of Merge, a single move candidate list is derived, so a single merge index (merge_idx) is signaled. There may be various motion candidate lists derived from a single coding unit, and a motion candidate index or a merge index may be signaled for each motion candidate list. In this case, a mode in which there is no information about residual blocks in blocks encoded using the merge mode may be called a MergeSkip mode.

Symmetric MVD (SMVD) is a method which makes motion vector difference (MVD) values in the L0 and L1 directions symmetrical in the case of bi-directional prediction, thereby reducing the bit rate of motion information transmitted. The MVD information in the L1 direction that is symmetrical to the L0 direction is not transmitted, and reference picture information in the L0 and L1 directions is also not transmitted, but is derived during decoding.

Overlapped block motion compensation (OBMC) is a method in which, when blocks have different pieces of motion information, prediction blocks for a current block are generated by using motion information of neighboring blocks, and the prediction blocks are then weighted averaged to generate a final prediction block for the current block. This has the effect of reducing the blocking phenomenon that occurs at the block edges in a motion-compensated video.

Generally, a merged motion candidate has low motion accuracy. To improve the accuracy of the merge motion candidate, a merge mode with MVD (MMVD) method may be used. The MMVD method is a method for correcting motion information by using one candidate selected from several motion difference value candidates. Information about a correction value of the motion information obtained by the MMVD method (e.g., an index indicating one candidate selected from among the motion difference value candidates, etc.) may be included in a bitstream and transmitted to the decoder. By including the information about the correction value of the motion information in the bitstream, a bit rate may be saved compared to including an existing motion information difference value in a bitstream.

A template matching (TM) method is a method of configuring a template through a neighboring pixel of a current block, searching for a matching area most similar to the template, and correcting motion information. Template matching (TM) is a method of performing motion prediction by a decoder without including motion information in a bitstream so as to reduce the size of an encoded bitstream. The decoder does not have an original image, and thus may schematically derive motion information of a current block by using a pre-reconstructed neighboring block.

A Decoder-side Motion Vector Refinement (DMVR) method is a method for correcting motion information through the correlation of already restored reference videos in order to find more accurate motion information. The DMVR method is a method which uses the bidirectional motion information of a current block to use, within predetermined regions of two reference pictures, a point with the best matching between reference blocks in the reference pictures as a new bidirectional motion. When the DMVR method is performed, the encoder may perform DMVR on one block to correct motion information, and then partition the block into sub-blocks and perform DMVR on each sub-block to correct motion information of the sub-block again, and this may be referred to as multi-pass DMVR (MP-DMVR).

A local illumination compensation (LIC) method is a method for compensating for changes in luma between blocks, and is a method which derives a linear model by using neighboring pixels adjacent to a current block, and then compensate for luma information of the current block by using the linear model.

Existing video encoding methods perform motion compensation by considering only parallel movements in upward, downward, leftward, and rightward directions, thus reducing the encoding efficiency when encoding videos that include movements such as zooming, scaling, and rotation that are commonly encountered in real life. To express the movements such as zooming, scaling, and rotation, affine model-based motion prediction techniques using four (rotation) or six (zooming, scaling, rotation) parameter models may be applied.

Bi-directional optical flow (BDOF) is used to correct a prediction block by estimating the amount of change in pixels on an optical-flow basis from a reference block of blocks with bi-directional motion. Motion information derived by the BDOF of VVC may be used to correct the motion of a current block.

Prediction refinement with optical flow (PROF) is a technique for improving the accuracy of affine motion prediction for each sub-block so as to be similar to the accuracy of motion prediction for each pixel. Similar to BDOF, PROF is a technique that obtains a final prediction signal by calculating a correction value for each pixel with respect to pixel values in which affine motion is compensated for each sub-block based on optical-flow.

The combined inter-/intra-picture prediction (CIIP) method is a method for generating a final prediction block by performing weighted averaging of a prediction block generated by an intra-picture prediction method and a prediction block generated by an inter-picture prediction method when generating a prediction block for the current block.

The intra block copy (IBC) method is a method for finding a part, which is most similar to a current block, in an already reconstructed region within a current picture and using the reference block as a prediction block for the current block. In this case, information related to a block vector, which is the distance between the current block and the reference block, may be included in a bitstream. The decoder can parse the information related to the block vector contained in the bitstream to calculate or set the block vector for the current block.

The bi-prediction with CU-level weights (BCW) method is a method in which with respect to two motion-compensated prediction blocks from different reference pictures, weighted averaging of the two prediction blocks is performed by adaptively applying weights on a block-by-block basis without generating the prediction blocks using an average.

The multi-hypothesis prediction (MHP) method is a method for performing weighted prediction through various prediction signals by transmitting additional motion information in addition to unidirectional and bidirectional motion information during inter-picture prediction.

A cross-component linear model (CCLM) is a method for configuring a linear model by using a high correlation between a luma signal and a chroma signal at the same location as the corresponding luma signal, and then predicting a chroma signal t the corresponding linear model. After a template is configured using a block completed to be reconstructed from among neighboring blocks adjacent to a current block, and then a parameter for the linear model is derived through the template. Next, a current luma block selectively reconstructed according to the size of the chroma block according to a video format is down-sampled. Lastly, a chroma component block of the current block is predicted using the down-sampled luma component block (sample) and the corresponding linear model. In this case, the method using two or more linear models is called a multi-model linear mode (MMLM).

A convolutional cross-component model (CCCM) is a method for configuring a non-linear model by using a high correlation between a luma signal and a chroma signal at the same location as the corresponding luma signal, and then predicting a chroma signal through the corresponding non-linear model.

A gradient linear model (GLM) is a method for configuring a model by additionally reflecting the gradient of a luma sample in a linear model such as the CCLM, and then predicting a chroma signal through the corresponding model. In independent scalar quantization, reconstructed coefficient $t'_k$ for input coefficient $t_k$ is only dependent on quantization index $q_k$. That is, a quantization index for any reconstructed coefficient has a value different from those of quantization indices for other reconstructed coefficients. In this case, $t'_k$ may be a value obtained by adding a quantization error to $t_k$, and may vary or remain the same according to a quantization parameter. Here, $t'_k$ may be also referred to as a reconstructed transform coefficient or a de-quantized transform coefficient, and the quantization index may be also referred to as a quantized transform coefficient.

In uniform reconstruction quantization (URQ), reconstructed coefficients have the characteristic of being arrangement at equal intervals. The distance between two adjacent reconstructed values may be called a quantization step size. The reconstructed values may include 0, and the entire set of available reconstructed values may be uniquely defined based on the quantization step size. The quantization step size may vary depending on quantization parameters.

In the existing methods, quantization reduces the set of acceptable reconstructed transform coefficients, and elements of the set may be finite. Thus, there are limitation in minimizing the average error between an original video and a reconstructed video. Vector quantization may be used as a method for minimizing the average error.

A simple form of vector quantization used in video encoding is sign data hiding. This is a method in which the encoder does not encode a sign for one non-zero coefficient and the decoder determines the sign for the coefficient based on whether the sum of absolute values of all the coefficients is even or odd. To this end, in the encoder, at least one coefficient may be incremented or decremented by "1", and the at least one coefficient may be selected and have a value adjusted so as to be optimal from the perspective of rate-distortion cost. In one example, a coefficient with a value close to the boundary between the quantization intervals may be selected.

Another vector quantization method is trellis-coded quantization, and, in video encoding, is used as an optimal path-searching technique to obtain optimized quantization values in dependent quantization. On a block-by-block basis, quantization candidates for all coefficients in a block are placed in a trellis graph, and the optimal trellis path between optimized quantization candidates is found by considering rate-distortion cost. Specifically, the dependent quantization applied to video encoding may be designed such that a set of acceptable reconstructed transform coefficients with respect to transform coefficients depends on the value of a transform coefficient that precedes a current transform coefficient in the reconstruction order. At this time, by selectively using multiple quantizers according to the transform coefficients, the average error between the original video and the reconstructed video is minimized, thereby increasing the encoding efficiency.

Among intra prediction encoding techniques, the matrix intra prediction (MIP) method is a matrix-based intra prediction method, and obtains a prediction signal by using a predefined matrix and offset values through pixels on the left and top of a neighboring block, unlike a prediction method having directionality from pixels of neighboring blocks adjacent to a current bloc.

To derive an intra-prediction mode for a current block, on the basis of a template which is a random reconstructed region adjacent to the current block, an intra-prediction mode for a template derived through neighboring pixels of the template may be used to reconstruct the current block. First, the decoder may generate a prediction template for the template by using neighboring pixels (references) adjacent to the template, and may use an intra-prediction mode, which has generated the most similar prediction template to an already reconstructed template, to reconstruct the current block. This method may be referred to as template intra mode derivation (TIMD).

In general, the encoder may determine a prediction mode for generating a prediction block and generate a bitstream including information about the determined prediction mode. The decoder may parse a received bitstream to set an intra-prediction mode. In this case, the bit rate of information about the prediction mode may be approximately 10% of the total bitstream size. To reduce the bit rate of information about the prediction mode, the encoder may not include information about an intra-prediction mode in the bitstream. Accordingly, the decoder may use the characteristics of neighboring blocks to derive (determine) an intra-prediction mode for reconstruction of a current block, and may use the derived intra-prediction mode to reconstruct the current block. In this case, to derive the intra-prediction mode, the a Sobel filter horizontally and decoder may apply a vertically to each neighboring pixel adjacent to the current block to infer directional information, and then map the directional information to the intra-prediction mode. The method by which the decoder derives the intra-prediction mode using neighboring blocks may be described as decoder side intra mode derivation (DIMD).

FIG. 7 illustrates the position of neighboring blocks used to construct a motion candidate list in inter prediction.

The neighboring blocks may be spatially located blocks or temporally located blocks. A neighboring block that is spatially adjacent to a current block may be at least one among a left (A1) block, a left below (A0) block, an above (B1) block, an above right (B0) block, or an above left (B2) block. A neighboring block that is temporally adjacent to the current block may be a block in a collocated picture, which includes the position of a top left pixel of a bottom right (BR) block of the current block. When a neighboring block temporally adjacent to the current block is encoded using an intra mode, or when the neighboring block temporally adjacent to the current block is positioned not to be used, a block, which includes a horizontal and vertical center (Ctr) pixel position in the current block, in the collocated picture corresponding to the current picture may be used as a temporal neighboring block. Motion candidate information derived from the collocated picture may be referred to as a temporal motion vector predictor (TMVP). Only one TMVP may be derived from one block. One block may be partitioned into multiple sub-blocks, and a TMVP candidate may be derived for each sub-block. A method for deriving TMVPs on a sub-block basis may be referred to as sub-block temporal motion vector predictor (sbTMVP).

Whether methods described in the present specification are to be applied may be determined on the basis of at least one of pieces of information relating to slice type information (e.g., whether a slice is an I slice, a P slice, or a B slice), whether the current block is a tile, whether the current block is a subpicture, the size of a current block, the depth of a coding unit, whether a current block is a luma block or a chroma block, whether a frame is a reference frame or a non-reference frame, and a temporal layer corresponding a reference sequence and a layer. Pieces of information used to determine whether methods described in the present specification are to be applied may be pieces of information promised between a decoder and an encoder in advance. In addition, such pieces of information may be determined according to a profile and a level. Such pieces of information may be expressed by a variable value, and a bitstream may include information on a variable value. That is, a decoder may parse information on a variable value included in a bitstream to determine whether the above methods are applied. For example, whether the above methods are to be applied may be determined on the basis of the width length or the height length of a coding unit. If the width length or the height length is equal to or greater than 32 (e.g., 32, 64, or 128), the above methods may be applied. If the width length or the height length is smaller than 32 (e.g., 2, 4, 8, or 16), the above methods may be applied. If the width length or the height length is equal to 4 or 8, the above methods may be applied.

A residual signal may be a signal regarding the difference between an original signal and a predicted signal generated through inter prediction or intra prediction. Energy regarding the residual signal may be distributed across the entire area of the pixel domain. Therefore, there may be a problem in that, if the decoder encodes the pixel value itself of the residual signal, the compression efficiency will deteriorate. This necessitates a process of concentrating the energy of the residual signal in the pixel domain in a low-frequency area of the frequency domain by using transform coding.

The high efficiency video coding (HEVC) standard mostly uses efficient discrete cosine transform type-II (DCT-II) in signals are evenly distributed in the pixel domain (if adjacent pixel values are similar), and limitedly uses discrete sine transform type-VII (DST-DII) with regard to intra-predicted 4×4 blocks only, thereby transforming the residual signal of the pixel domain to a frequency area. The DST-DII transform may be appropriate for a residual signal generated through inter prediction (a case in which energy is evenly distributed in the pixel domain). However, a residual signal generated through intra prediction may tend to have energy increasing in proportion to the distance from reference samples, considering the characteristics of the intra prediction by which predictions are made by using reconstructed reference samples around the current encoding unit. Therefore, no high encoding efficiency can be accomplished solely by using the DST-DII transform.

FIG. 8 illustrates a method for performing a CCLM according to an embodiment of the present disclosure.

Referring to FIG. 8, a template may be configured using a block for which reconstruction is completed among neighboring blocks adjacent to a current block. A video signal processing apparatus (e.g., a decoder or an encoder) may derive a parameter for a linear model by using the template. A luma component block (sample) selectively reconstructed according to the size of the chroma block according to a video format may be down-sampled. The video signal processing apparatus may predict a chroma component block (sample) of the current block by using the down-sampled luma component block (sample) and the linear model. In this case, two or more linear models may be used, and the method using two or more linear models is called a multi-model linear mode (MMLM).

FIG. 9 illustrates a template used to derive a linear model according to an embodiment of the present disclosure.

A video signal processing apparatus may derive a parameter for a linear model by using only some of neighboring samples adjacent to a current block. The location of a part represented in a dark gray in FIG. 9 may be the location of a sample used to derive a parameter for the linear model. In a case of the format of 4:2:0, the size of a chroma component block is ¼ of that of a luma component block. Accordingly, a luma component sample down-sampled for 1:1 matching between the luma component sample and the chroma component sample may be used to derive the parameter for the linear model. Two types of filters may be used to derive the down-sampled luma component sample. An encoder may acquire a bitstream including filter-type information relating to a type of filter to be used. In addition, the type of filter (type 1 or type 2) may be determined according to units (for example, SPS level, PPS level, picture header (PH) level, slice level, tile level, CU level, sub-block level, etc.) of filter, in which the filter is used. A decoder may parse filter-type information included in the bitstream to determine/configure the type of filter for adaptively deriving the luma component sample. Type 1 of FIG. 9 is a method for using six samples to derive a luma component sample at the center of upper samples. The video signal processing apparatus may generate the down-sampled luma component sample by applying type 1 at location A of FIG. 9. Type 2 of FIG. 9 is a method of using five samples to derive a luma component sample at the center of the five samples. The video signal processing apparatus may generate the down-sampled luma component sample by applying type 2 to location C. The template used to derive the parameter for the linear model may be configured with the down-sampled luma component sample. Hereinafter, a method for configuring the template is described.

In addition, the video signal processing apparatus may configure a template with the down-sampled luma component sample with reference to a sample in the current luma component block. Referring to location B of FIG. 9, when type 1 is used to generate the down-sampled luma component sample, three upper samples may be samples of neighboring blocks adjacent to the current block, and three lower samples 901 may be samples of reconstructed luma component blocks within the current block. In this case, the location of a finally generated luma component sample may be a hatched location 902 of B in FIG. 9. The same is also applied when type 2 is used at location of FIG. 9 to generate the down-sampled luma component sample. That is, location X sample 903 of D in FIG. 9 may be a sample of the reconstructed luma component block within the current block, and the remaining four samples may be samples of neighboring samples adjacent to the current block. In this case, the location of a finally generated luma component sample may be a hatched location 904 of D in FIG. 9.

In addition, the video signal processing apparatus may configure a template with the down-sampled luma component sample with reference to only samples of neighboring blocks remaining after excluding the sample within the current luma component block. Referring to location B in FIG. 9, when type 1 is used to generate the down-sampled luma component sample, the video signal processing apparatus may acquire the down-sampled luma component sample by using three upper samples only (i.e., except for the reconstructed luma component sample 901 within the current block), and configure the template. In this case, the location of a finally generated luma component sample may be a hatched location 902 of B in FIG. 9. The same is also applied when type 2 is used at location D in FIG. 9 to generate the down-sampled luma component sample. That is, the video signal processing apparatus may acquire the down-sampled luma component sample by using four samples (neighboring samples adjacent to the current block) remaining after excluding the sample (location X sample 903 of D in FIG. 9) within the current luma component block, and configure the template. In this case, the location of the finally generated luma component sample may be a hatched location 904 of D in FIG. 9.

In addition, referring to FIG. 9, the video signal processing apparatus may generate the down-sampled luma sample by using three consecutive lines including one line adjacent to the current block. In this case, when the upper boundary of the current block is a CTU boundary, the video signal processing apparatus may configure a template by using only one line that is the most adjacent to the current block to save memory on a line buffer. To enable types 1 and 2 of filter to be applied, samples of one adjacent line (first line) may be padded into the second line and the third line. Alternatively, the padding into the second line and the third line may be performed using a value obtained by applying a predetermined weight to the sample of the first line.

Samples existing in the location where the efficient is high among the samples adjacent to the current block may be included in the template. Specifically, the template may include samples having high efficiency among the left neighboring samples and the upper neighboring In this case, the encoder samples of the current block may acquire a bitstream including information on samples to be included. In addition, the decoder may parse information on samples to be included to configure a template. A method for performing signaling by including, in the bitstream, such information on samples to be included has a problem of increasing a bit rate. Hereinafter, a method for implicitly determining samples to be included in the template is described.

The locations of samples included in the template may be determined on the basis of an intra prediction directivity mode of the current block. That is, when the intra prediction directivity mode corresponds to a direction close to upper samples of the current block, or a predetermined first mode, only the upper samples may be included in the template. When the intra prediction directivity mode corresponds to a direction close to left samples of the current block, or a predetermined second mode, only the left samples may be included in the template. In this case, the first mode may be an intra prediction directivity mode corresponding to an index larger than 50. The second mode may be an intra prediction directivity mode corresponding to an index smaller than 18. In addition, when the intra prediction directivity mode is an intra prediction directivity mode corresponding to an index equal to or greater than index 18 and equal to or smaller than index 50, the template may include both the upper samples of the current block and the left samples of the current block.

To configure an accurate template, a sample reconstructed with a higher image quality may be required. Accordingly, the template may be configured by comparing a quantization parameter value used when reconstructing left adjacent neighboring blocks of the current block and a quantization parameter value used when reconstructing upper adjacent neighboring blocks of the current block. For example, a template including samples of neighboring blocks using a smaller quantization parameter value between a quantization parameter value used when reconstructing left adjacent neighboring blocks of the current block and a quantization parameter value used when reconstructing upper adjacent neighboring blocks of the current block may be configured. On the contrary, a template including samples of neighboring blocks using a larger quantization parameter value between a quantization parameter value used when reconstructing left adjacent neighboring blocks of the current block and a quantization parameter value used when reconstructing upper adjacent neighboring blocks of the current block may be configured. When the quantization parameter value used when reconstructing the left adjacent neighboring blocks of the current block is identical to the quantization parameter value used when reconstructing upper adjacent neighboring blocks of the current block, a template including samples of the left adjacent neighboring blocks of the current block and samples of the upper adjacent neighboring blocks of the current block may be configured. In addition, when a difference between the quantization parameter value used when reconstructing the left adjacent neighboring blocks of the current block and the quantization parameter value used when reconstructing the upper adjacent neighboring blocks of the current block is within a pre-configured value, a template including samples of the left adjacent neighboring blocks of the current block and samples of the upper adjacent neighboring blocks of the current block may be configured.

In addition, the samples included in the template may be determined by comparing the size of the current block (for example, a product (i.e., the number of samples) of the horizontal length and the vertical length of the current block)) with a specific value. When the size of the current block is smaller than the specific value, the left neighboring samples of the current block and the upper neighboring samples of the current block may be included in the template. On the contrary, when the size of the current block is equal to or larger than the specific value, the left neighboring samples of the current block and the upper neighboring samples of the current block may be included in the template. The specific value is a value determined on the basis of a sum of sizes of the horizontal length or the vertical length of the current block, and may be an integer equal to or greater than 1.

In addition, samples included in the template may be determined according to a ratio of the horizontal length to the vertical length of the current block. For example, when the horizontal length of the current block is longer than the vertical length, left (or upper) neighboring samples of the current block may be included in the template. On the contrary, when the horizontal length of the current block is shorter than the vertical length, upper (or left) neighboring samples of the current block may be included in the template. When the horizontal length of the current block is identical to the vertical length, left neighboring samples and upper neighboring samples of the current block may be included in the template.

In addition, the template may be determined on the basis of whether the CCLM and the MMLM are applied to the left and upper neighboring blocks of the current block. Samples of the block to which the CCLM and the MMLM are applied may be included in the template. For example, when the CCLM and the MMLM are not applied to the left neighboring blocks of the current block and the CCLM and the MMLM are applied to the upper neighboring blocks of the current block, the upper neighboring samples of the current block may be included in the template.

In addition, samples included in the template may be determined on the basis of the number of times that reference sample padding is performed. For example, when the number of samples for which the number of times that reference sample padding is performed among the left neighboring samples of the current block is equal to or greater than a specific number, the left neighboring samples of the current block may not be included in the template. That is, the upper neighboring samples of the current block may be included in the template. Similarly, when the number of samples for which reference sample padding is performed among samples of the upper neighboring blocks of the current block is equal to or greater than a specific number, the upper neighboring samples of the current block may not be included in the template. That is, the left neighboring samples of the current block may be included in the template. In this case, the specific number may be an integer equal to or greater than 1. In a case where neither the upper neighboring samples nor the left neighboring samples of the current block are included in the template, neither the CCLM or the MMLM may be applied to the current block when configuration is made so that neither the left template nor the upper template can be referenced. In addition, when configuration is made so that neither the left template nor the upper template can be referenced, the decoder may configure no CCLM and the MMLM to be used for the current block, without parsing information related to the CCLM and the MMLM into the current block.

When the number of samples included in the template configured by applying the above-described method, or the like is smaller than a predetermined number, or when the size of the current block is equal to or less than a specific size, a linear model for prediction of a chroma component block of the current block may be a linear model to which a pre-defined basic parameter is applied. This is because the linear model is difficult to be derived when the number of samples is small. In this case, the predetermined number and the specific size may correspond to an integer equal to or greater than 1. Alternatively, when the number of samples is smaller than the predetermined number or when the size of the current block is equal to or less than the specific size, the CCLM and the MMLM may not be applied to the current block. In addition, when the number of samples is smaller than the predetermined number or when the size of the current block is equal to or less than the specific size, the decoder may configure no CCLM and the MMLM to be used for the current block, without parsing information related to the CCLM and the MMLM into the current block.

The neighboring samples of the current block, which are included in the template, may be samples before deblocking filtering is applied. Alternatively, when luma mapping with chroma scaling (LMCS) is applied to the current block, the neighboring samples of the current block may be samples before inverse-mapping or samples for which inverse-mapping is performed.

The video signal processing apparatus may derive a parameter for a liner model by using the template. One or more linear models may be used for each block, and information on the number of linear models to be used for each block may be included in a bitstream. The decoder may parse information on the number of linear modes to be used for each block, so as to use the same to derive linear models for the current block. A method for deriving the linear model may include a least-mean-square (LMS) method, a min/max method, etc. Hereinafter, a method for deriving a linear model is described.

First, a min/max method is described. The video signal processing apparatus first determines values ($X^0_A$ and $X^1_A$) for two small samples and values ($X^0_B$ and $X^1_B$) for two large samples among four chroma samples at pre-promised locations within the template. In addition, the video signal processing apparatus may derive an average ($X_a$ or $Y_a$) of small values and an average ($X_b$ or $Y_b$) of large values by using luma sample values ($Y^0_A$, $Y^1_A$, $Y^0_B$, and $Y^1_B$) corresponding to the four samples, respectively, at the pre-promised locations within the template. In this case, Equation 1 may be used to derive the average ($X_a$ or $Y_a$) of the small values and the average ($X_b$ or $Y_b$) of the large values.

Referring to Equation 1, $X_a$ may be an average of values ($X^0_A$ and $X^1_A$) for two small samples among four samples at pre-promised d locations within the template. $Y_a$ may be an average of $Y^0_A$ and $Y^1_A$ corresponding to luma sample values corresponding to values ($X^0_A$ and $X^1_A$) for two small samples, respectively, among four samples at the pre-promised locations within the template. $X_b$ may be an average of values ($X^0_B$ and $X^1_B$) for two large samples among four samples at the pre-promised locations within the template. $Y_b$ may be an average of $Y^0_B$ and $Y^1_B$ corresponding to luma sample values corresponding to two large samples ($X^0_B$ and $X^1_B$), respectively, among four samples at the pre-promised locations within the template. The video signal processing apparatus may calculate linear model parameters α and β by using Equation 2. The video signal processing apparatus may predict a chroma block by calculating each sample value $pred_c$ of a chroma block by using linear model parameters α and β and (down-sampled) luma sample value ($rec_L'$). Each sample value of the chroma block may be calculated as in Equation 3. (i, j) in Equation 3 may denote coordinates when coordinates of the upper left samples of the current block are assumed as (0, 0). That is, $pred_c$ (i, j) may denote a sample value of the chroma block at location (i, j).

$$X_a = (x^0{}_A + x^1{}_A + 1) \gg 1;\ X_b = (x^0{}_B + x^1{}_B + 1) \gg 1$$ [Equation 1]

$$Y_a = (y^0{}_A + y^1{}_A + 1) \gg 1;\ Y_b = (y^0{}_B + y^1{}_B + 1) \gg 1$$

$$\alpha = \frac{Y_a - Y_b}{X_a - X_b} \quad \beta = Y_b - \alpha \cdot X_b$$ [Equation 2]

$$pred_c(i, j) = \alpha \cdot rec_L'(i, j) + \beta$$ [Equation 3]

Next, an LMS method is described. The video signal processing apparatus may calculate linear model parameters α and β as in Equations 4 and 5 according to the LMS method. $Rec_c(i)$ and $Rec'_L(i)$ in Equations 4 and 5 denote values of the chroma sample and the down-sampled luma sample, respectively, in the template, and i denotes the number of samples in the template. For example, the sample in the template may be a sample at the location shown in gray in FIG. 9. The video signal processing apparatus may predict the chroma block by calculating each sample value $pred_c$ of the chroma block by applying α and β acquired through Equations 4 and 5 to Equation 3. α may be expressed in a fraction.

$$\alpha = \frac{I \times \sum_{i=0}^{I} Rec_C(i) \times Rec_L'(i) - \sum_{i=0}^{I} Rec_C(i) \times \sum_{i=0}^{I} Rec_L'(i)}{I \times \sum_{i=0}^{I} Rec_L'(i) \times Rec_L'(i) - \left(\sum_{i=0}^{I} Rec_L'(i)\right)^2} = \frac{A_1}{A_2}$$ [Equation 4]

$$\beta = \frac{\sum_{i=0}^{I} Rec_C(i) - \alpha \cdot \sum_{i=0}^{I} Rec_L'(i)}{I}$$ [Equation 5]

To enhance encoding efficiency of the linear model (CCLM or MMLM), the video signal processing apparatus may use two or more linear models as well as one linear model. That is, the video signal processing apparatus may use the models by mixing the existing CCLM mode in which only one linear model is used and the MMLM mode in which two or more linear models are used. In this case, information related to whether the CCLM mode is used or the MMLM mode is used may be included in a bitstream, and whether the CCLM mode is used or the MMLM mode is used may be determined in units of CUs.

FIG. 10 illustrates a method for deriving two linear models according to an embodiment of the present disclosure.

When multiple linear models are used, calculation complexity of a video signal processing apparatus may increase, and thus a case where two linear models are used is described below.

Referring to FIG. 10, a video signal processing apparatus may select a sample for deriving two linear models by using one template. In this case, the sample can be selected on the basis of a threshold. The threshold may be an average value of reconstructed luma component samples in a template, or a value acquired using the average value. Two linear models using the threshold may be as in Equation 6. [x, y] in Equation 6 may mean coordinates when coordinates of the left upper sample of the current block are (0, 0). That is, Pred. [x, y] may mean a sample value of a chroma block at the location of (x, y). $Rec'_L(i)$ may mean a down-sampled luma sample in the template.

scaled average value for the luma component samples in the template. In this case, the number of samples in each group may be a multiple of 2. If not a multiple of 2, the video signal processing apparatus may perform padding using neighboring samples so that the number of samples in each group becomes a multiple of 2. When the number of samples in each group is smaller than a predetermined number, padding may not be performed. The video signal processing apparatus may calculate a parameter for a linear model for each group by using Equations 4 and 5. When the number of samples in each group is smaller than a predetermined number, a difference value obtained by subtracting the average value of luma component samples in the template from the average value of chroma component samples in the template may be parameter β for the linear model. In addition, when the number of samples in each group is smaller than a predetermined number, only one linear model may be derived and used. The predetermined number is an integer equal to or greater than 1, and may be, for example, 4.

When the MMLM is applied, the video signal processing apparatus may use a method below to derive a more accurate parameter for a linear model.

$$\begin{cases} Pred_C[x, y] = \alpha_1 \times Rec'_L[x, y] + \beta_1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases}$$ [Equation 6]

Hereinafter, a method for deriving parameters α1, α2, β1, and β2 for two linear models is described.

The video signal processing apparatus may acquire (calculate) an average value of luma component samples within the template and an average value of chroma component samples within the template. In this case, the average value of luma component samples and the average value of chroma component samples may be an average value scaled samples within a confirmed range on the basis of the number of samples of each template. This is to more accurately distinguish two linear models. The average value of luma component samples within the template may be calculated using the down-sampled luma component sample or luma component samples before down-sampling. In addition, a sample to be used among the down-sampled luma component sample and the luma component samples before down-sampling may vary according to an SPS level, a PPS level, a picture header (PH) lever, a slice level, a tile level, a CU level, or a sub-block level. A decoder may parse information indicating a sample to be used among the luma component samples before down-sampling and the down-sampled luma component sample included in a bitstream, and adaptively determine/configure a sample to be used among the down-sampled luma component sample and the luma component samples before down-sampling. The parameter for the linear model may be configured as a basic value. For example, α1 and α2 may be configured as 0, and β1 and β2 may be configured as a half of a maximum value in the range of a current video format. When the maximum value in the range of the video format is 8 bits, β1 and β2 may be configured as 128. In addition, a shift value for reconstructing a scaled value to the original may be configured as "0". When the number of samples in the template is smaller than a predetermined number, two linear models configured using the basic parameters. When the predetermined number is an integer equal to or greater than 1, and may be, for example, 4. Chroma samples at the same location as each of the luma samples may be divided into two groups with reference to a A threshold for deriving a linear model may be acquired (calculated) on the basis of the average value of reconstructed luma component samples in the current block instead of the average value of the luma component samples in the template of neighboring blocks adjacent to the current block. Alternatively, the threshold for deriving the linear model may be acquired (calculated) on the basis of an average value of the average value of reconstructed luma component samples within the current block and the average value of the luma component samples in the template. According to a color format, the average value of the reconstructed luma component samples in the current block may be the average value of samples of the down-sampled luma component block. Alternatively, the threshold for deriving the linear model may be acquired (calculated) on the basis of the average value of the chroma component samples in the template instead of the average value of the luma component samples in the template. In this case, two linear models for two chroma components (Cb component and Cr component). To derive a linear model for each of the chroma components, the average value of the chroma component samples in the template may be used. The threshold for applying two linear models for the reconstructed luma component sample in the current block may be classified into two by using the average value of the chroma component samples in the template. The encoder may acquire a bitstream including information on the threshold. The decoder may acquire a threshold for deriving two linear models by parsing information on the threshold. In this case, the information on the threshold may directly indicate a threshold. However, when the threshold is directly indicated, there is a problem that a bit rate is increased, and thus the information on the threshold may indicate an index of a pre-configured table. That is, a table for thresholds mapped to one or more indices, respectively, may be pre-configured, and the information on the threshold value may indicate one of the one or more indices. The decoder may use a threshold corresponding to the index indicated by the information on the threshold. The thresholds included in the table may be a pre-defined or may be a threshold used for neighboring blocks. The thresholds included in the table may be a predetermined number (e.g., 1 or more) of thresholds, and may be configured through the form of first in first out (FIFO). That is, the table may be configured in the scheme in which the threshold used for the neighboring blocks of the current block is included in the table. The information on the threshold may be signaled in units of respective blocks, and the threshold may be applied in units of respective blocks. In this case, the information on each block unit may be included in the bitstream and signaled. The decoder may configure the threshold in units of respective blocks by parsing the information on the block unit.

Hereinafter, a method for determining the number (one or two) of linear models used for prediction of a chroma component block is described in detail.

i) When a reference line index for configuring samples of a current luma component block is equal to or greater than 1, a decoder may predict a chroma component block by using one linear model. This is because there is high possibility that the current block is a linearly changing block. ii) When the reference line index used for configuring samples of the current luma component block is 0 (when samples are configured on a line adjacent to the current block), the decoder may predict the chroma component block by using one or two linear models. That is, the decoder may determine, on the basis of the reference line index, whether to parse a syntax element related to a CCLM and an MMLM (for example, information on a threshold, information related to whether a CCLM mode is used or an MMLM mode is used, information on the number of linear models to be used for each block, etc.). The decoder may not parse the syntax element related to the CCLM and the MMLM when the reference line index is equal to or greater than 1. The decoder may infer that the CCLM using one linear model for prediction of the chroma component block is used when the reference line index is equal to or greater than 1. The syntax element related to the CCLM and the MMLM (for example, information on a threshold, information related to whether a CCLM mode is used or an MMLM mode is used, information on the number of linear models to be used for each block, etc.) may not be included in a bitstream. The encoder may acquire a bitstream including the syntax element related to the CCLM and the MMLM (for example, information on a threshold, information related to whether a CCLM mode is used or an MMLM mode is used, information on the number of linear models to be used for each block, etc.) when the reference line index is 0. The decoder may parse the syntax element related to the CCLM and the MMLM when the reference line index is 0. iii) The number of linear models for predicting the chroma component block may be determined on the basis of the size of the current block. For example, when the size of the horizontal length or the vertical length of the current block is smaller than a predetermined value (for example, an integer equal to or greater than 1), the decoder may predict the chroma component block by using one linear model. iv) When the size of the current block is equal to or greater than a predetermined value, the decoder may divide the current block into multiple sub-blocks, and predict the chroma component block by applying the linear model to each of In this case, a template for the multiple sub-blocks. deriving the linear model of each sub-block may include reconstructed samples of the closest neighboring blocks with reference to the corresponding sub-block. For example, as shown in FIG. 9, the current block may be divided into four sub-blocks. In this case, the decoder may derive a linear model for the first sub-block by using both the left and upper templates. The decoder may derive a linear model for the second sub-block by using the upper template. The decoder may derive a linear model for the third sub-block by using the left template. The decoder may derive a linear model for the fourth sub-block by using the upper template used to derive the linear model for the second sub-block and the left template used to derive the linear model for the third sub-block. v) The number of linear models for predicting the chroma component block may be determined on the basis of one or more of an intra prediction mode of the current luma component block, a coefficient distribution of residual blocks of the current luma component block, a quantization parameter of the current block, and whether the CCLM or the MMLM of used for the neighboring blocks. For example, when there is one or more blocks to which the MMLM is applied among the neighboring blocks of the current block, the MMLM may be also applied to the current block. In addition, when the CCLM is applied to all the neighboring blocks of the current block, the CCLM may be applied to the current block. vi) The decoder may acquire one new linear model on the basis of two linear models for the current block, which are signaled so that the MMLM is applied. That is, the decoder may make reconfigure the current block so that the CCLM mode is applied, and may predict the chroma component block by using the one new linear model. The decoder may acquire two linear models for the current block, and may acquire one new linear model on the basis of the similarity between parameter values of the two linear models. In this case, the similarity between parameter values of the two linear models may be determined on the basis of one or more of the similarity between $\alpha 1$ and $\alpha 2$ and the similarity between $\beta 1$ and $\beta 2$. When a difference between an absolute value of the similarity between $\alpha 1$ and $\alpha 2$ and an absolute value of the similarity between $\beta 1$ and $\beta 2$ is smaller than a predetermined value (for example, an integer equal to or greater than 1), the parameter values for the two linear models may be determined to be similar to each other. There are two chroma components (i.e., Cb component and Cr component), the number of the linear models for each of the two chroma components may vary.

In general, the same intra prediction directivity mode may be applied to the two chroma components. The same number of linear models may be applied to the two chroma components. To increase the encoding efficiency, an intra prediction model may be signaled to each chroma component, and the number of linear models applied to each chroma component may vary. For example, a horizontal intra prediction mode may be applied to a Cb chroma component, and a prediction mode in which two linear model are used may be applied to a Cr chroma component. In addition, information on whether an LM mode (CCLM or MMLM) is applied to two chroma components is signaled, and information on a mode between the CCLM and the MMLM to be applied to each chroma component may be additionally signaled. In addition, information on whether the MMLM is applied to both chroma components is signaled, and the video signal processing apparatus may determine the similarity between two linear models derived for each chroma component, so as to implicitly determine whether the CCLM or the MMLM is applied to each of the chroma components. In this case, additional information on each of the chroma components is not signaled, and there is an effect of reducing a bit rate.

The video signal processing apparatus may use two intra prediction directivity modes may be used in generating a luma prediction block in a TIMD mode. The TIMD encoding mode may be useful for a block, the directivity characteristics of which do not accurately exist. That is, when the TIMD mode is applied to the current block, an intra prediction mode for the chroma component block of the current block may be implicitly configured as a CCLM or MMLM mode. In this case, information on whether the CCLM or the MMLM is applied to the chroma component block of the current block may be signaled. In this case, information on whether the CCLM or the MMLM is applied to each chroma component block may be included in a bitstream and signaled. When the TIMD mode is applied to the current block, the decoder may parse information on whether the CCLM or the MMLM is applied to determine a mode applied to each chroma component block. Alternatively, information on whether the CCLM or the MMLM is applied to each chroma component block may not be separately signaled. In this case, the decoder may implicitly configure the MMLM is to be applied to each chroma component block, and reconfigure the CCLM to be applied to each chroma component block by using the above-described method (method for acquiring one new linear model on the basis of the similarity between parameter values for two linear models). Such methods may be applied to not only a block coded using a TIMD mode but also a block coded using an MIP and DIMD modes.

When the TIMD and DIMD encoding modes are applied to the current block, the decoder may generate respective prediction blocks by using two intra prediction directivity modes, and then generate a final prediction luma block by weight-averaging the respective prediction blocks. The decoder may generate a reconstructed luma block by summating the final prediction luma block and a residual block. The decoder needs to perform the CCLM or the MMLM by using the reconstructed luma block to generate the chroma component block. Such a method has a problem that the processing speed is slow as there are many processing stages. Accordingly, to enhance the processing speed, the decoder may generate a chroma block by applying the CCLM or the MMLM to the final prediction luma block rather than the reconstructed luma block. The accuracy may be reduced in the method for generating the chroma block by applying the CCLM or the MMLM to the final prediction luma block, compared to the method for generating the chroma block by applying the CCLM or the MMLM to the reconstructed luma block. Accordingly, information on whether to apply the CCLM or the MMLM to the final prediction luma block and whether to apply the CCLM or the MMLM to the reconstructed luma block may be included in a bitstream and signaled. That is, the decoder may parse information on whether to apply the CCLM or the MMLM to the final prediction luma block and whether to apply the CCLM or the MMLM to the reconstructed luma block, the information being included in the bitstream, so as to determine a block to which the CCLM or the MMLM is to be applied.

The intra prediction directivity mode applied to the chroma component block may be a derived mode or direct mode (DM), an explicit mode (EM), and a linear model (LM). The DM may be a mode in which the intra prediction directivity mode of the luma component block is used as the intra prediction directivity mode of the chroma component block. The EM may be a mode in which the intra prediction directivity mode of the chroma component block is specified as one of a planar mode, a DC mode, a horizontal mode, and a vertical mode. In the EM, the intra prediction directivity mode of the chroma component block may be configured not be identical to the intra prediction directivity mode of the luma component block. The EM may be described as a non-direct mode. The LM is a mode of predicting the chroma component block by using the linear model and the reconstructed luma component block, and may have different characteristics from the existing angular mode and none-angular mode (planar mode and DC mode).

FIG. 11 illustrates a method of signaling an intra prediction directivity mode for a chroma component block according to an embodiment of the present disclosure.

Hereinafter, a method for signaling an intra prediction directivity mode for a chroma component block of a current block is described. First, whether an LM mode is applied to predict the chroma component block may be first signaled. In this case, when the LM mode is not applied to predict the chroma component block, information on whether a DM and/or an EM is applied may be signaled. When the LM is applied to predict the chroma component block, information related to whether the CCLM mode or the MMLM mode is applied to predict the chroma component block and information for deriving a linear mode may be signaled. In this case, information on a template may be information on whether the template includes left samples of the current block, includes upper samples, and includes all the left samples and the upper samples. Hereinafter, a method for signaling an intra prediction directivity mode for a chroma component block of the current block is described in more detail.

Referring to FIG. 11(*a*), the decoder may parse a syntax element (lm_flag) for indicating whether the LM is applied to predict the chroma component block, so as to determine whether the LM is applied to predict the chroma component block. When the value of lm_flag is 1, lm_flag may indicate the LM is applied, and when the value of lm_flag is 0, lm_flag may not indicate the LM is not applied. When lm_flag indicates that the LM is not applied to predict the chroma component block (for example, when the value of lm_flag is 0), the decoder may parse information on whether the EM and/or the DM is applied to predict the chroma component block. When lm_flag indicates that the LM mode is applied to predict the chroma component block (for example, when the value of lm_flag is 1), the decoder may parse a syntax element (mmlm_flag) indicating whether the MMLM mode is used to predict the chroma component block. When the value of mmlm_flag is 1, mmlm_flag may indicate that the MMLM mode is used, and when the value of mmlm_flag is 0, mmlm_flag may indicate that the CCLM mode is used. When mmlm_flag indicates that the MMLM mode is used to predict the chroma component block (for example, when the value of mmlm_flag is 1), the decoder may additionally parse a syntax element (template_idx) indicating a template to be used. For example, when the value of template_idx is 1, the left samples and the upper samples of the current block may be included in the template, and the video signal processing apparatus may derive a linear model by using the left samples and the upper samples of the current block. When the value of template_idx is 00, the left samples of the current block may be included in the template, and the video signal processing apparatus may derive a linear model by using only the left samples of the current block. When the value of template_idx is 01, the upper samples of the current block may be included in the template, and the video signal processing apparatus may derive a linear model by using only the upper samples of the current block. When the value of mmlm_flag is 0, mmlm_flag may indicate that the CCLM mode is used to predict the chroma component block. In this case, the video signal processing apparatus may parse template_idx to predict the chroma component block on the basis of samples indicated by template_idx.

In addition, in a case of the MMLM mode, two or more linear models are required, and thus many samples may be Accordingly, it may be effective to use both required. the left samples and the upper samples of the current block. Accordingly, the signaling method of FIG. 11(*a*) may be changed as follows. First, the decoder may parse lm_flag. When lm_flag indicates that the LM is not used to predict the chroma component block (for example, when the value of lm_flag is 0), the decoder may parse information on whether the EM and/or the DM is applied to predict the chroma component block. When lm_flag indicates the LM is applied to predict the chroma component block (for example, when the value of lm_flag is 1), the decoder may parse mmlm_flag. When mmlm_flag indicates that the MMLM mode is used to predict the chroma component block (for example, when the value of mmlm_flag is 1), template_idx may not be parsed, and the value of template_idx may be inferred as a value (for example, 1) indicating that the left samples and the upper samples of the current block are used to derive the linear model. This is because using the left samples and the upper samples is more efficient in the MMLM mode. When mmlm_flag indicates that the CCLM mode rather than the MMLM is applied (when the value of mmlm_flag is 0), the decoder may additionally parse template_idx. For example, when the value of template_idx is 1, the left samples and the upper samples of the current block may be included in the template, and the video signal processing apparatus may derive a linear model by using the left samples and the upper samples of the current block. When the value of template_idx is 00, the left samples of the current block may be included in the template, and the video signal processing apparatus may derive a linear model by using the left samples of the current block. When the value of template_idx is 01, the upper samples of the current block may be included in the template, the video signal processing apparatus may derive a linear model by using only the upper samples of the current block. When the value of mmlm_flag is 1, whether template_idx is parsed may be determined or the value of template_idx may be inferred as a predetermined value by using one or more of an intra prediction mode of a current luma component block, the size of a coding block, a feature of a residual block, a quantization parameter, whether the CCLM and/or the MMLM mode is used for neighboring blocks, and a reference line index. For example, when the size of the current block is smaller than a predetermined value (for example, an integer equal to or greater than 1), template_idx may not be parsed, and the value of template_idx may be inferred as a value (for example, 1) indicating that the left samples and the upper samples of the current block are used to derive a linear model.

In addition, referring to FIG. 11(*b*), the decoder may parse lm_flag. In this case, when lm_flag indicates that the LM is not applied (for example, when the value of lm_flag is 0), the decoder may parse information on whether the EM and/or the DM is applied. When lm_flag indicates that the LM is applied (for example, when the value of lm_flag is 1), the decoder may parse template_idx. For example, when the value of template_idx is 1, the left samples and the upper samples of the current block may be included in the template, and the video signal processing apparatus may derive a linear model by using the left samples and the upper samples of the current block. When the value of template_idx is 00, the left samples of the current block may be included in the template, and the video signal processing apparatus may derive a linear model by using only the left samples of the current block. When the value of template_idx is 01, the upper samples of the current block may be included in the template, and the video signal processing apparatus may derive a linear model by using only the upper samples of the current block. Unlike the method of FIG. 11(*a*), a syntax element for a mode to be used between the CCLM mode and the MMLM mode is not parsed, and the decoder may derive two linear models for the CCLM mode and the MMLM mode, and determine a mode (the CCLM mode or the MMLM mode) applied for prediction of the chroma block on the basis of the similarity between the two linear models.

FIGS. 12 and 13 illustrate a context model according to an embodiment of the present disclosure.

mmlm_flag and template_idx may be entropy-coded using context adaptive binary arithmetic coding (CABAC). A context model for mmlm_flag and template_idx may be defined as a value (see FIGS. 12 and 13) obtained through an experiment.

initValue of FIG. 12(*a*) and initValue of FIG. 13(*a*) indicate context models for mmlm_flag and context models for template_idx, respectively. shiftIdx may be used during probability for updating mmlm_flag and template_idx. initValue may be determined according to the type of a current slice. That is, initValue may be determined according to whether the current slice is slice I, slice P, or slice B. FIGS. 12(*b*) and 13(*b*) indicate a context model which can be used according to each slice type. Referring to FIG. 12(*b*), an initialization type (initType) of mmlm_flag may be determined according to a current slice type, and initValue may be determined according to an initialization type. Referring to FIG. 13(*b*), an initialization type (initType) of template_idx may be determined according to a current slice type, and initValue may be determined according to an initialization type. For example, when the type of the current slice is slice I, the value of initType may be 0 to 2. When the current slice type is slice P, the value of initType may be 3 to 5. When the current slice type is slice B, the value of initType may be 6 to 8. The value of initType determined according to the slice type may be identical to a value of ctxIdx of mmlm_flag of FIG. 12(*a*), and may be identical to a value of ctxIdx of template_idx of FIG. 13(*a*). initValue may be determined as a value corresponding to FIGS. 12(*a*) and 13(*a*) according to the value of initType determined according to each type of the current slice.

iniType may be determined as a value for each slice type. For example, when the type of the current slice is slice I, the value of initType may be 0. When the type of the current slice is slice P, the value of iniType may be 3. When the type of the current slice may be slice B, the value of initType may be 6. initValue may be determined as a value corresponding to FIG. 12(*a*) according to the value of initType determined as a value according to each type of the current slice. For example, when the value of initType is 0, the value of ctxIdx of mmlm_flag may be 0, the value of initValue may be 20 according to FIG. 12(*a*), and the value of shiftIdx may be 4. When the value of initType is 0, the value of ctxIdx of template_idx may be 0, the value of initValue may be 17 according to FIG. 13(*a*), and the value of shiftIdx may be 1. When the value of initType is 3, the value of ctxIdx of mmlm_flag may be 3, the value of initValue may be 35 according to FIG. 12(*a*), and the value of shiftIdx may be 4. When the value of initType is 3, the value of ctxIdx of template_idx may be 3, the value of initValue may be 0 according to FIG. 13(*a*), and the value of shiftIdx may be 1. When the value of initType is 6, the value of ctxIdx of mmlm_flag may be 6, the value of initValue may be 38 according to FIG. 12(*a*), and the value of shiftIdx may be 4. When the value of initType is 6, the value of ctxIdx of template_idx may be 6, the value of initValue may be 0 according to FIG. 13(*a*), and the value of shiftIdx may be 1.

In addition, the use of initType according to a slice type may be selectively applied to each slice. For example, the use order of the value of initType may be changed according to the value of sh_cabac_init_flag defined in the slice header. When the value of sh_cabac_init_flag is 1 and the type of the current slice is slice P, the value of initType may be 6. When the value of sh_cabac_init_flag is 1 and the type of the current slice is slice B, the value of initType may be 3. When the value of sh_cabac_init_flag is 0 and the type of the current slice is slice P, the value of initType may be 3. When the value of sh_cabac_init_flag is 0 and the type of the current slice is slice B, the value of initType may be 6.

The video signal processing apparatus may select a symbol of mmlm_flag currently coded or parsed from among several context models on the basis of an intra prediction mode of a current luma component block, the size of the horizontal length or the vertical length of the coding block (or the ratio of the horizontal length to the vertical length, a difference between the horizontal length and the vertical length, or the like), a quantization parameter, whether the CCLM and/or the MMLM is used for neighboring blocks, a feature of a residual symbol (information on whether there is a residual signal of a luma component block and information on the location of the last transform coefficient), a movement information differential value, and a reference line index. Hereinafter, a method for selecting a symbol of mmlm_flag among several context models by a video signal processing apparatus is described.

The video signal processing apparatus may select a context index of a symbol of mmlm_flag on the basis of mmlm_flag information of neighboring blocks of the current The mmlm_flag information may mean a value of block. mmlm_flag. For example, the value of mmlm_flag may be 0 or 1, and when the value of mmlm_flag is 0, mmlm_flag may indicate that the MMLM is not used for the corresponding block, and when the value of mmlm_flag is 1, mmlm_flag may indicate that the MMLM is used for the corresponding block. For example, the context index of the mmlm_flag symbol may be determined through a sum of mmlm_flag information of the left neighboring blocks adjacent to the current block and mmlm_flag information of the upper neighboring blocks adjacent to the current block. That is, the context index may be a value of 0 to 2. In this case, when the neighboring blocks are at an unavailable locations, 0 may be added to the context index.

The video signal processing apparatus may select a context index of a symbol of mmlm_flag on the basis of the size of the current block. For example, when the size of the current block is greater than a first value, the context index may be 2, when the size of the current block is smaller than a second value, the context index may be 0, and when the size of the current block is equal to or greater than the second value and is equal to or smaller than the first value, the context index may be 1. In this case, the first value and the second value are pre-configured values, the first value may be 32×32, and the second value may be 16×16. In addition, the first value and the second value may be configured on the basis of a sum of the sizes of the horizontal length and the vertical length of the current block.

The video signal processing apparatus may select a context index of a symbol of mmlm_flag on the basis of a difference between sizes of the horizontal length and the vertical length of the current block. When the sizes of the horizontal length and the vertical length of the current block are identical to each other, the context index may be 0. When the size of the horizontal length of the current block is greater than the size of the vertical length, the context index may be 1. When the size of the horizontal length of the current block is smaller than the size of the vertical length, the context index may be 2.

The video signal processing apparatus may not perform binary arithmetic coding through a context model for mmlm_flag, and may perform bypass-type binary arithmetic coding using a fixed probability interval.

The video signal processing apparatus may perform binary arithmetic coding for mmlm_flag by using only one context model. In this case, there is only one context model each according to a slice type, thus the context model index may not be derived, and as all blocks of the slice may be used, the fixed context model may be used.

The video signal processing apparatus may select, from among several models, context a symbol of template_idx to be currently coded or parsed by using one or more of an intra prediction mode of a current luma component block, the size of the horizontal length or the vertical length of the coding block (or the ratio of the horizontal length to the vertical length, a difference between the horizontal length and the vertical length, or the like), a quantization parameter, whether the CCLM and/or the MMLM is used for neighboring blocks, a feature of a residual symbol (information on whether there is a residual signal of a luma component block and information on the location of the last transform coefficient), a movement information differential value, and a reference line index. Two bins may constitute template_idx, a context model technique may be applied to the first bin, and the bypass-type binary arithmetic coding may be performed or a fixed context model may be used for the second bin. Hereinafter, a method for selecting a symbol of template_idx from among several context models by the video signal processing apparatus is described.

The video signal processing apparatus may select a context index of a symbol of template_idx on the basis of the size of the current block. For example, when the size of the current block is greater than a first value, the context index may be 2, when the size of the current block is smaller than a second value, the context index may be 0, and when the size of the current block is equal to or greater than the second value and is equal to or smaller than the first value, the context index may be 1. In this case, the first value and the second value are pre-configured values, the first value may be 32×32, and the second value may be 16×16. In addition, the first value and the second value may be configured on the basis of a sum of the sizes of the horizontal length and the vertical length of the current block.

The video signal processing apparatus may select a context index of a symbol of template_idx on the basis of a difference between sizes of the horizontal length and the vertical length of the current block. When the sizes of the horizontal length and the vertical length of the current block are identical to each other, the context index may be 0. When the size of the horizontal length of the current block is greater than the size of the vertical length, the context index may be 1. When the size of the horizontal length of the current block is smaller than the size of the vertical length, the context index may be 2.

The video signal processing apparatus may not perform binary arithmetic coding through a context model for template_idx, and may perform bypass-type binary arithmetic coding using a fixed probability interval.

The video signal processing apparatus may perform binary arithmetic coding for template_idx by using only one context model. In this case, there is only one context model each according to a slice type, thus the context model index may not be derived, and as all blocks of the slice may be used, the fixed context model may be used.

In the LM, the reconstructed block and the linear model are used, and the LM may be applied to a block coded using an intra mode and a chroma block of the block coded using an inter mode. The inter mode is advantageous in that the processing speed is high since the dependency on neighboring blocks is low, whereas the LM is disadvantageous in that the processing speed is low since the dependency on neighboring blocks is high. Accordingly, when the LM is applied to the inter mode, the LM may not be applied to a coding mode having the low processing speed (for example, GPM, Affine, sbTMVP, BCW, PROF, BDOF, TM, MP-DMVR, OBMC, MHP, and LIC). The LM may be applied to a chroma component block coded using a coding mode (for example, Merge, MergeSkip, MMVD, AMVP, SMVD, and CIIP) having a relatively high coding processing speed for the luma component block. In this case, information on whether the LM is applied to the chroma component block may be signaled. That is, the decoder may parse information on whether the LM is applied to the chroma component block from a bitstream and determine whether the LM is applied to the chroma component block of a block coded using the inter mode.

A method for predicting a block may be largely divided into an intra prediction method using spatial correlation and an inter prediction method using temporal correlation. When the intra prediction method is applied information related to intra to the current block, included in the bitstream, and prediction may be information related to inter prediction may not be included in the bitstream. On the contrary, when the inter prediction method is applied to the current block, the information related to the inter prediction may be included in the bitstream, and the information related to the intra prediction may not be included in the bitstream. The coding information of the current block (information on whether the intra prediction method is applied or the intra prediction method is applied) may be predicted on the basis of coding information of the neighboring blocks. For example, when the intra prediction is applied to the current block, prediction for the current block may be performed on the basis of the intra prediction information of the neighboring blocks of the current block. However, in a case where all the neighboring blocks are blocks to which inter prediction is applied, there is a problem that the efficiency is reduced when the intra prediction is applied to the current block. To solve such a problem, the video signal processing apparatus may increase intra prediction efficiency of a next block to be processed, by including, in the bitstream, the intra prediction information of the neighboring blocks for which the inter prediction is performed. A method for deriving intra prediction information of the block for which inter prediction is performed may use the fact that there is high possibility that the current block has similar video characteristics to the reference block. That is, the intra prediction information of the reference block may be used as the intra prediction information of the current block.

FIG. 14 illustrates a method for deriving an intra prediction mode of a current block by using neighboring blocks according to an embodiment of the present disclosure.

Referring to FIG. 14, neighboring blocks of a current block may have different sizes from each other. When the current block is coded using an intra prediction mode, a video signal processing apparatus may configure an MPM list by using the intra prediction mode of neighboring blocks of the current block, and then code the intra prediction mode for the current block by using the MPM list. When the neighboring blocks are blocks coded using inter prediction when the intra prediction mode of the neighboring blocks is derived, the video signal processing apparatus may derive the intra prediction mode of the current block from a reference picture by using movement information of the neighboring blocks. Specifically, the MPM list may include an intra prediction mode stored at the location obtained through movement by movement information of the neighboring blocks with reference to the location corresponding to the left upper pixel location of the neighboring blocks of the reference picture. For example, the intra prediction mode of neighboring block Ne-A2/A3 in FIG. 14 may be an intra prediction mode of M4 or O5 of the reference picture, and the MPM list may include a stored intra prediction mode of M4 or O5.

The intra prediction mode of the current block may be similar to the intra prediction mode of the neighboring block, and the accuracy of the intra prediction mode may further increase as the location used to derive the intra prediction mode of the neighboring block gets closer to the current block. Accordingly, the location used to derive the intra prediction mode of the neighboring block may be reconfigured as the location close to the current block. For example, the intra prediction mode of neighboring block Ne-L3 in FIG. 14 may be an intra prediction mode of J16 or J17 at the location closer to the current block than H16 or 117. In addition, the video signal processing apparatus may derive the intra prediction mode from the reference picture by projecting movement information of the neighboring block with reference to the location of the current block. For example, to derive the intra prediction mode for neighboring block Ne-A2/A3 in FIG. 14, the video signal processing apparatus may not use the intra prediction mode of M4 corresponding to the location obtained through movement by movement information of neighboring block Ne-A2/A3 with reference to the location corresponding to the left upper pixel location of neighboring block Ne-A2/A3 from the reference picture, and may derive the intra prediction mode of the location of the current block and use the same. That is, to derive the intra prediction mode for neighboring block Ne-A2/A3, the video signal processing apparatus may derive the intra prediction mode of M10 corresponding to the location obtained through movement by movement information of neighboring block Ne-A2/A3 with reference to the location corresponding to the central pixel location of the current block from the reference picture, and use the same as the intra prediction mode of neighboring block Ne-A2/A3. The derived intra prediction mode may be included in configuring the MPM list of the current block. In this case, the video signal processing apparatus may derive the intra prediction mode of the location obtained through movement by movement information of the neighboring block with reference to a predetermined location within the current block, rather than the location of the central pixel of the current block. For example, the predetermined location may be one of the left upper location, the upper central location, the right upper location, the left central location, the left lower location, the lower central location, the right lower location, and the right central location of the current block. In this case, the video signal processing apparatus may generate an intra prediction block of a corresponding sub-block by using at least one of several intra prediction modes derived using movement information of several neighboring blocks. The video signal processing apparatus may use, as an optimal intra prediction mode, one of a median value, an average value, a minimum value, and a maximum value of several intra prediction modes. The above-described method may be also applied when a chroma component block of the current block is coded using the LM. For example, the video signal processing apparatus may derive the intra prediction mode for the chroma component block of the current block from a reference picture by projecting movement information of the neighboring block with reference to the location of the current block. In this case, when the derived intra prediction mode is the LM, the video signal processing apparatus may acquire, from the reference picture, at least one of information on whether a mode among the CCLM, MMLM, the CCCM, and the GLM, applied to the neighboring block, information on samples used (left samples and upper samples), and filter coordinate information, and use the same in predicting the current chroma block. To this end, LM coding information for the corresponding chroma block needs to be all stored in the reference picture.

A CIIP mode is a method for weight-averaging each prediction block after performing both intra prediction and inter prediction for the current block. When the CIIP mode is applied to the current block, movement information of the current block is already included in a bitstream, and thus the video signal processing apparatus may use movement information of the current block when deriving the intra prediction mode from the reference picture. In this case, when the intra prediction mode of the chroma component block derived from the reference picture is one of the LM, CCLM, MMLM, CCCM, and GLM, the chroma component block of the current block may be predicted as a coding mode of the chroma component block of the reference block. In this case, to increase the processing speed for the block coded using the CIIP mode, the video signal processing apparatus may perform intra prediction and inter prediction only for the luma component block, and then weight-average and generate the prediction block, and a prediction block of the chroma component block may be generated using the chroma coding mode of the corresponding reference block. That is, the video signal processing apparatus may increase the processing speed since inter prediction does not need to be performed for the chroma component block.

The above-described method for deriving a parameter for a linear model may be used using only samples of a promised location. Accordingly, the accuracy of the linear model may vary according to the accuracy of the samples at the promised location. In general, when a video is filmed by a camera, noise may be generated in a sample at a predetermined location, and when the sample at the location at which the noise is generated is used in driving the parameter of the linear model, there is a problem that the accuracy of the linear model is reduced. Hereinafter, a method for solving this problem is described.

FIG. 15 illustrates a method for acquiring a chroma prediction block according to an embodiment of the present disclosure.

Referring to FIG. 15, a video signal processing apparatus may configure a first template including neighboring samples of a current block. The video signal processing apparatus may selectively perform low-frequency filtering among the neighboring samples within the template to make the neighboring samples be similar to one another. That is, the video signal processing apparatus may configure a second template including similar neighboring samples. Alternatively, the video signal processing apparatus may perform high-frequency filtering for the neighboring samples within the template to clearly separate noise, and then may determine a sample corresponding to a predetermined threshold or greater as noise to remove the same from the template. In this case, the sample determined as noise and thus removed may be padded using one of neighboring pixels, or may be configured as a value obtained by weight-averaging the neighboring pixels. That is, the video signal processing apparatus may configure a third template by padding the sample determined as noise and thus removed by using one of neighboring pixels, or configuring a value obtained by weight-averaging the neighboring pixels. The filtering and noise removal may be selected performed for each level of an SPS, a PPS, a PH, a slice, a tile, a CU, and a sub-block. In this case, information on whether the filter and noise removal are performed may be included in a bitstream and signaled, and a decoder may parse the information on whether the filtering and noise removal are performed, so as to determine whether to perform the filtering and noise removal. The video signal processing apparatus may derive a parameter for a linear model and acquire a first linear model on the basis of samples within the second template or the third template. The video signal processing apparatus may perform verification of the first linear model by using the samples within the first template. The video signal processing apparatus may perform verification on the basis of whether when the samples within the first template are applied to the first linear model, the samples are within a predetermined error value (for example, an integer equal to or greater than 1) and a ratio of samples within the error value to all samples within the first template is equal to or greater than a predetermined ratio (for example, a value between 0 and 1). In this case, when the ratio of the samples within the error value to all samples within the first template is smaller than the predetermined ratio, a second linear model may be derived using other samples remaining after excluding the samples used to derive the first linear model. The video signal processing apparatus may repeatedly perform the linear model deriving process to derive an $n^{th}$ linear model. In this case, the linear model deriving process may be repeated until the samples within the first template are all used in the deriving process or the number of remaining samples which can be used for deriving the linear model is within a predetermined number (for example, an integer equal to or greater than 1). In addition, the video signal processing apparatus may acquire a down-sampled luma component block (sample) and predict a chroma component block (sample) by performing the method described in the present disclosure.

FIG. 16 illustrates a reference area used to generate a linear model according to an embodiment of the present disclosure.

As described with reference to FIG. 9, a video signal processing apparatus may use a filter of type 1 or type 2 to generate a down-sampled luma component sample. A dark gray sample in FIG. 16 is the location at which the down-sampled luma component sample is generated, and a light gray sample indicates neighboring samples used to generate a luma component sample at the dark gray location. In this case, the gray samples may be described as the reference area. A decoder may use one or more reference lines to predict a current block. In this case, an encoder may generate a bitstream including information on a line to be used among the one or more reference lines. In this case, such information on a line to be used may be an index of the reference line. The decoder may predict a current block by using a reference line corresponding to an index acquired by parsing the information on a line to be used. When the reference line used for prediction of the current block is a line adjacent to the current block, the decoder may use the reference area in FIG. 16(*a*) to derive a linear model for prediction a chroma component sample. In this case, the line adjacent to the current block may be a line spaced apart from the current block by n samples. In this case, n is an integer equal to or greater than 1, and may be 3. That is, referring to FIG. 16(*a*), samples on the reference lines (reference lines 0, 1, and 2) corresponding to indices 0, 1, and 2 may be a reference area (when n is 3). When the reference line used for prediction of the current block is a line not being adjacent to the current block, the decoder may use a reference area in FIG. 16(*b*) to derive a linear model for predicting the chroma component sample. In this case, the line not being adjacent to the current block may be a line after a line spaced apart from the current block by k samples. In this case, k is an integer equal to or greater than 1, and may be 3. That is, referring to FIG. 16(*b*), samples on a reference line after the reference line (reference line 2) corresponding to index 2 may be a reference area (when k is 3).

The video signal processing apparatus may derive (use) two linear models when predicting the chroma component sample through the MMLM method. In this case, the video signal processing apparatus may derive a first linear model by using the reference area of FIG. 16(*a*), and derive a second linear model by using the reference area of FIG. 16(*b*). When the above-described information on a line to be used does not indicate an index of a line adjacent to the current block (for example, indicates an index greater than 1), linear models may be derived from different reference areas.

A linear model derived when the sample used to derive a linear model used to predict a chroma component sample gets closer to the current block may well present characteristics of the current block. Accordingly, a more effective linear model may be derived when the samples adjacent to the current block are used. When the sample used to predict the luma component sample for the current block is a sample on a line not being adjacent to the current block, noise may not be included. Due to such noise, the decoder may not be able to derive an effective linear model. That is, the decoder may determine whether the CCLM, the MMLM, the GLM, the CCCM, or the like is used or activated according to a line of a reference sample used to predict the luma component sample for the current block. For example, the decoder may not use the CCLM, MMM, CLM, CCCM, or the like to predict a current block when the index of the line of the sample used to predict the luma component sample for the current block is greater than a predetermined value (for example, 3 corresponding to an integer equal to or greater than 1). That is, syntax related to the CCLM, MMLM, GLM, and CCCM may not be parsed, and the syntax related to the CCLM, MMLM, GLM, and CCCM may be inferred to indicate that the CCLM, MMLM, GLM, and CCCM are not used or not activated. The syntax may be inferred (implied) not to be parsed or not to used.

FIG. 17 illustrates a method for processing a video signal according to an embodiment of the present disclosure.

Hereinafter, referring to FIG. 17, the method for processing a video signal, described through FIGS. 1 to 16, is described.

A video signal processing apparatus may configure a template including neighboring blocks of a current block (S1710). The video signal processing apparatus may perform down-sampling of luma component samples of the neighboring blocks on the basis of a color format of a current picture including the current block (S1720). The video signal processing apparatus may derive a first linear model and a second linear model on the basis of the down-sampled luma component samples (S1730). The video signal processing apparatus may predict, on the basis of one linear model from among the first linear model and the second linear model, a chroma component sample at a location corresponding to a location of a first sample from among the luma component samples of the current block (S1740). The one linear model may be determined by comparing a value of the first sample with a threshold value In addition, the video signal processing apparatus may perform high-frequency filtering or low-frequency filtering for the neighboring blocks including the template.

The threshold value may be an average value of reconstructed luma component blocks within the current block.

The threshold value may be an average value of chroma component samples of the neighboring blocks.

The threshold value may be determined on the basis of threshold value information included a bitstream.

The neighboring blocks included in the template may be upper adjacent first blocks of the current block, left adjacent second blocks of the current block, or the first blocks and the second blocks.

The neighboring blocks included in the template may be determined on the basis of an intra prediction directivity mode of the current block.

The neighboring blocks included in the template may be determined by comparing a first quantization parameter value used for reconstruction of the first blocks and a second quantization parameter value used for reconstruction of the second blocks.

The neighboring blocks included in the template may be determined on the basis of a size of the current block.

The neighboring blocks included in the template may be determined on the basis of whether a cross-component linear model (CCLM) or a multi-model linear mode (MMLM) is applied to the first blocks and the second blocks.

The neighboring blocks included in the template may be determined on the basis of neighboring block information included in a bitstream.

The neighboring blocks included in the template may be blocks on a line spaced apart from the current block by a specific number of samples, or blocks on a line spaced apart from the current block by an interval equal to or less than the specific number of samples.

The above methods (video signal processing methods) described in the present specification may be performed by a processor in a decoder or an encoder. Furthermore, the encoder may generate a bitstream that is decoded by a video signal processing method. Furthermore, the bitstream generated by the encoder may be stored in a computer-readable non-transitory storage medium (recording medium).

The present specification has been described primarily from the perspective of a decoder, but may function equally in an encoder. The term "parsing" in the present specification has been described in terms of the process of obtaining information from a bitstream, but in terms of the encoder, may be interpreted as configuring the information in a bitstream. Thus, the term "parsing" is not limited to operations of the decoder, but may also be interpreted as the act of configuring a bitstream in the encoder. Furthermore, the bitstream may be configured to be stored in a computer-readable recording medium.

The above-described embodiments the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather the than above detailed description, and all changes or modifications derived from the meaning and range of the appended claims and equivalents thereof are to be interpreted as being included within the scope of present invention.

The invention claimed is:

1. A video signal decoding apparatus comprising a processor, wherein the processor is configured to:

obtain information of a linear model of a reference block, wherein the reference block is included in a reference picture corresponding to motion information of a first neighboring block of a current block, wherein the linear model is obtained based on the correlation between a luma component sample of the reference block and a chroma component sample of the reference block, derive the linear model for the current block based on the information, and predict a chroma component sample of the current block based on the linear model.

2. The video signal decoding apparatus of claim 1, wherein the information includes information on a prediction mode for deriving the linear model, and wherein the prediction mode is one of CCLM (Cross-component linear model), MMLM (Multi-model Linear mode), and CCCM (Convolutional cross-component model).

3. The video signal decoding apparatus of claim 1, wherein the information includes information related to a filter coefficient of the linear model.

4. The video signal decoding apparatus of claim 3, wherein the information is stored in a memory of the video signal decoding apparatus.

5. A video signal encoding apparatus comprising a processor, wherein the processor is configured to obtain a bitstream decoded by a decoding method, wherein the decoding method comprises:

obtaining information of a linear model of a reference block, wherein the reference block is included in a reference picture corresponding to motion information of a first neighboring block of a current block, wherein the linear model is obtained based on the correlation between a luma component sample of the reference block and a chroma component sample of the reference block;

deriving the linear model for the current block based on the information; and predicting a chroma component sample of the current block based on the linear model.

6. The video signal encoding apparatus of claim 5, wherein the information includes information on a prediction mode for deriving the linear model, and wherein the prediction mode is one of CCLM (Cross-component linear model), MMLM (Multi-model Linear mode), and CCCM (Convolutional cross-component model).

7. The video signal encoding apparatus of claim 5, wherein the information includes information related to a filter coefficient of the linear model.

8. The video signal encoding apparatus of claim 7, wherein the information is stored in a memory of the video signal encoding apparatus.

9. A method for obtaining a bitstream, the method comprising:

obtaining information of a linear model of a reference block, wherein the reference block is included in a reference picture corresponding to motion information of a first neighboring block of a current block, wherein the linear model is obtained based on the correlation between a luma component sample of the reference block and a chroma component sample of the reference block;

deriving the linear model for the current block based on the information;

predicting a chroma component sample of the current block based on the linear model; and obtaining the bitstream by encoding a video signal based on the information.

10. The method of claim 9, wherein the information includes information on a prediction mode for deriving the linear model, and wherein the prediction mode is one of CCLM (Cross-component linear model), MMLM (Multi-model Linear mode), and CCCM (Convolutional cross-component model).

* * * * *